(12) United States Patent
Yoo et al.

(10) Patent No.: US 12,088,014 B2
(45) Date of Patent: Sep. 10, 2024

(54) ELECTRONIC DEVICE INCLUDING ANTENNA STRUCTURE FOR UWB-BASED POSITIONING

(71) Applicant: SAMSUNG ELECTRONICS CO., LTD., Suwon-si (KR)

(72) Inventors: Youngsuk Yoo, Suwon-si (KR); Woosup Lee, Suwon-si (KR); Sukgi Hong, Suwon-si (KR); Dongyeon Kim, Suwon-si (KR); Jungsik Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 170 days.

(21) Appl. No.: 17/829,813

(22) Filed: Jun. 1, 2022

(65) Prior Publication Data

US 2022/0393367 A1  Dec. 8, 2022

Related U.S. Application Data

(63) Continuation of application No. PCT/KR2022/007252, filed on May 20, 2022.

(30) Foreign Application Priority Data

Jun. 3, 2021 (KR) .................. 10-2021-0072216

(51) Int. Cl.
*H01Q 21/06* (2006.01)
*H01Q 1/24* (2006.01)
(Continued)

(52) U.S. Cl.
CPC .......... *H01Q 21/065* (2013.01); *H01Q 1/243* (2013.01); *H01Q 5/25* (2015.01); *H01Q 9/045* (2013.01)

(58) Field of Classification Search
CPC .......... H01Q 1/243; H01Q 5/25; H01Q 9/045; H01Q 21/065
See application file for complete search history.

(56) References Cited

U.S. PATENT DOCUMENTS 7,868,841 B2  1/2011  Pettus
7,903,030 B2  3/2011  Nagai
(Continued)

FOREIGN PATENT DOCUMENTS

EP  2766952 B1 *  4/2022  .......... G01S 13/931
JP  11-266118  9/1999
(Continued)

OTHER PUBLICATIONS

Search Report dated Sep. 13, 2022 issued in International Patent Application No. PCT/KR2022/007252.

*Primary Examiner* — Dameon E Levi
*Assistant Examiner* — Leah Rosenberg
(74) *Attorney, Agent, or Firm* — Nixon & Vanderhye, P.C.

(57) ABSTRACT

Disclosed is an electronic device. The electronic device includes: an antenna structure including at least one antenna and at least one processor operatively connected with the antenna structure. The antenna structure includes: a first conductive patch including a first edge and a second edge parallel to the first edge, a first transmission line electrically connected to a first point of the first conductive patch, a second conductive patch spaced apart from the first conductive patch by a specified distance and including a third edge at least partially facing the second edge of the first conductive patch and a fourth edge parallel to the third edge, and a second transmission line electrically connected to a second point of the second conductive patch. The first point of the first conductive patch and the second point of the second conductive patch are located on the second edge of the first (Continued)

conductive patch and the third edge of the second conductive patch or on the first edge of the first conductive patch and the fourth edge of the second conductive patch.

16 Claims, 20 Drawing Sheets

(51) Int. Cl.
  *H01Q 5/25* (2015.01)
  *H01Q 9/04* (2006.01)

(56) References Cited

U.S. PATENT DOCUMENTS

| | | | |
|---|---|---|---|
| 8,232,924 | B2 | 7/2012 | Bucca et al. |
| 9,966,652 | B2 | 5/2018 | Mangrum et al. |
| 10,469,127 | B2 | 11/2019 | McLaughlin et al. |
| 10,566,680 | B2 | 2/2020 | Mangrum |
| 10,923,800 | B2 | 2/2021 | Mangrum |
| 11,095,017 | B2 | 8/2021 | Cooper et al. |
| 11,217,904 | B2 | 1/2022 | Li et al. |
| 2008/0252543 | A1* | 10/2008 | Pettus .................. H01Q 9/0407 343/793 |
| 2009/0256777 | A1 | 10/2009 | Nagai |
| 2010/0007561 | A1 | 1/2010 | Bucca et al. |
| 2019/0245276 | A1 | 8/2019 | Li et al. |
| 2020/0021011 | A1 | 1/2020 | Cooper et al. |
| 2020/0153082 | A1 | 5/2020 | Mangrum |
| 2021/0151854 | A1 | 5/2021 | Mangrum et al. |
| 2021/0351494 | A1 | 11/2021 | Cooper et al. |
| 2022/0368028 | A1 | 11/2022 | Govoni et al. |
| 2023/0216216 | A1* | 7/2023 | Land .................. G07C 9/00944 343/702 |
| 2024/0047874 | A1* | 2/2024 | Sahin ...................... H01Q 1/38 |

FOREIGN PATENT DOCUMENTS

| | | | | |
|---|---|---|---|---|
| JP | H-11266118 | A | * | 9/1999 |
| JP | 2019-129439 | A | | 8/2019 |
| WO | WO-2019135588 | A1 | * | 7/2019 ............ H01Q 1/243 |

\* cited by examiner

ELECTRONIC DEVICE INCLUDING ANTENNA STRUCTURE FOR UWB-BASED POSITIONING

CROSS-REFERENCE TO RELATED APPLICATIONS

This application is a continuation of International Application No. PCT/KR2022/007252 designating the United States, filed on May 20, 2022, in the Korean Intellectual Property Receiving Office and claiming priority to Korean Patent Application No. 10-2021-0072216, filed on Jun. 3, 2021, in the Korean Intellectual Property Office, the disclosures of which are incorporated by reference herein in their entireties.

BACKGROUND

Field

The disclosure relates to an electronic device including an antenna structure for UWB-based positioning.

Description of Related Art

With the development of wireless communication technology, connectivity technology by which an electronic device is connected with an external device to provide various functions has made an appearance. For example, the electronic device may detect the position of the electronic device itself or the external device (e.g., an IoT device), based on wireless communication with the external device. The electronic device may control various functions of the external device, or may provide various position-based services to a user carrying the electronic device, based on the detected position.

Meanwhile, ultra-wide band (UWB) communication technology is applied to accurately detect the position of the electronic device itself and/or the position of the external device.

The electronic device may include a plurality of antennas to perform position measurement. For example, the electronic device may measure the direction of the external device and the distance to the external device by transmitting/receiving wireless communication signals with the external device using at least two antennas. The electronic device may measure the position of the external device, based on the measured direction and the measured distance.

The coverage of position measurement may vary depending on the separation distance between the at least two antennas of the electronic device. For example, to measure the position of the external device located in the range of −90 degrees to +90 degrees with respect to the electronic device, the separation distance between the at least two antennas may have to satisfy a specified distance (e.g., half the wavelength of a wireless signal).

However, the electronic device is made thin and compact and has an increasing number of components therein to perform various functions. Due to the space limitation of the electronic device, it may be difficult to satisfy the distance between the antennas of the electronic device. Furthermore, even though the distance between the antennas is satisfied, the coverage and/or accuracy of position measurement may be degraded due to other factors (e.g., a ground condition, permittivity, polarization characteristics, effects of electronic components adjacent to the antennas, and the like).

SUMMARY

Embodiments of the disclosure provide an electronic device including an antenna structure for preventing and/or reducing degradation in positioning performance due to the distance between conductive patches or other factors by adjusting the positions of feeding points of the conductive patches.

An electronic device according to an example embodiment of the disclosure includes: an antenna structure including at least one antenna and at least one processor operatively connected with the antenna structure. The antenna structure includes: a dielectric substance, a first conductive patch t disposed on the dielectric substance including a first edge and a second edge parallel to the first edge, a first transmission line electrically connected to a first point of the first conductive patch, a second conductive patch disposed on the dielectric substance and spaced apart from the first conductive patch by a specified distance, the second conductive patch including a third edge at least partially facing the second edge of the first conductive patch and a fourth edge parallel to the third edge, a second transmission line electrically connected to a second point of the second conductive patch, and a ground disposed under the dielectric substance. The at least one processor is configured to: control the electronic device to receive a wireless signal of a specified band by supplying power to the first conductive patch and the second conductive patch through the first transmission line and the second transmission line. The first point of the first conductive patch and the second point of the second conductive patch being located on the second edge of the first conductive patch and the third edge of the second conductive patch or on the first edge of the first conductive patch and the fourth edge of the second conductive patch.

An electronic device according to an example embodiment of the disclosure includes: a housing, a printed circuit board disposed in the housing, a support disposed on the printed circuit board and covering at least a partial area of the printed circuit board, an antenna structure disposed on the support, and at least one processor disposed on the printed circuit board and operatively connected with the antenna structure. The antenna structure includes: a dielectric substance, a first conductive patch disposed on the dielectric substance and including a first edge and a second edge parallel to the first edge, a first transmission line electrically connected to a first point of the first conductive patch, a second conductive patch disposed on the dielectric substance and spaced apart from the first conductive patch by a specified distance and including a third edge at least partially facing the second edge of the first conductive patch and a fourth edge parallel to the third edge, a second transmission line electrically connected to a second point of the second conductive patch, and a ground disposed under the dielectric substance. The at least one processor is configured to: control the electronic device to receive a wireless signal of a specified band by supplying power to the first conductive patch and the second conductive patch through the first transmission line and the second transmission line. The first point of the first conductive patch and the second point of the second conductive patch are located on the second edge of the first conductive patch and the third edge of the second conductive patch such that a distance between centers of phase patterns formed from the first conductive patch and the second conductive patch is greater than the specified distance, or are located on the first edge of the first conductive patch and the fourth edge of the second conductive patch such that the distance between the centers of the phase patterns formed from the first conductive patch and the second conductive patch is less than the specified distance.

According to various example embodiments of the disclosure, degradation in positioning performance due to the distance between the conductive patches or other factors may be prevented and/or reduced.

According to various example embodiments of the disclosure, degradation in positioning performance due to the distance between the conductive patches or other factors may be prevented and/or reduced by adjusting the positions of the feeding points of the conductive patches.

According to various example embodiments of the disclosure, degradation in positioning performance due to the distance between the conductive patches or other factors may be prevented and/or reduced using a phenomenon in which the phase patterns vary depending on the positions of the feeding points of the conductive patches.

In addition, the disclosure may provide various effects that are directly or indirectly recognized.

BRIEF DESCRIPTION OF THE DRAWINGS

The above and other aspects, features and advantages of certain embodiments of the present disclosure will be more apparent from the following detailed description, taken in conjunction with the accompanying drawings, in which.

With regard to description of the drawings, identical or similar reference numerals may be used to refer to identical or similar components.

DETAILED DESCRIPTION

Hereinafter, various example embodiments of the disclosure may be described with reference to accompanying drawings. Accordingly, those of ordinary skill in the art will recognize that various modifications, equivalents, and/or alternatives on the various example embodiments described herein can be variously made without departing from the scope and spirit of the disclosure.

Figure 1A:
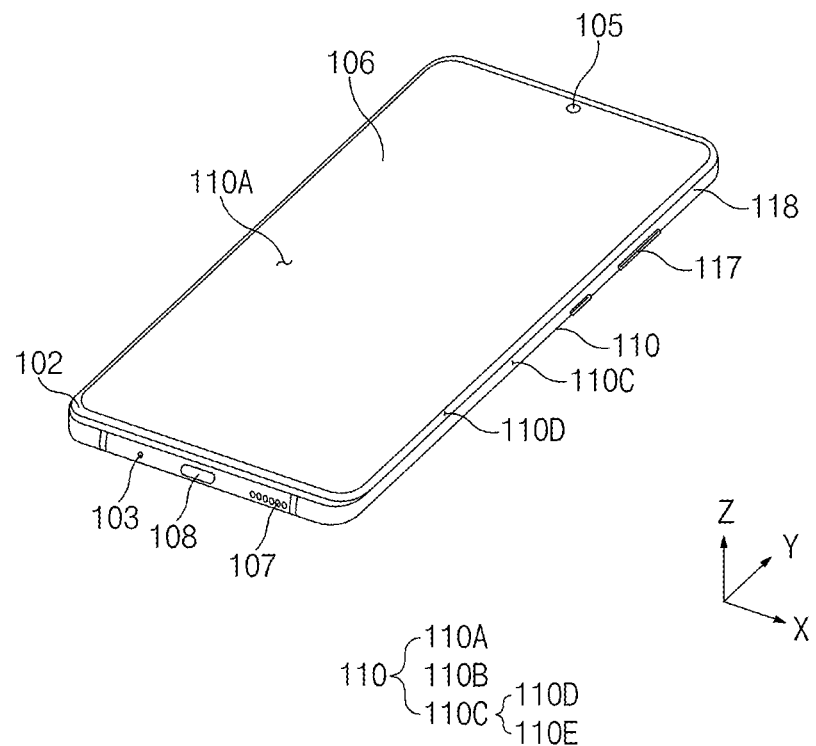
FIG. 1A is a front perspective view of an electronic device according to various embodiments.

FIG. 1A is a front perspective view of an electronic device according to various embodiments.

Figure 1B:
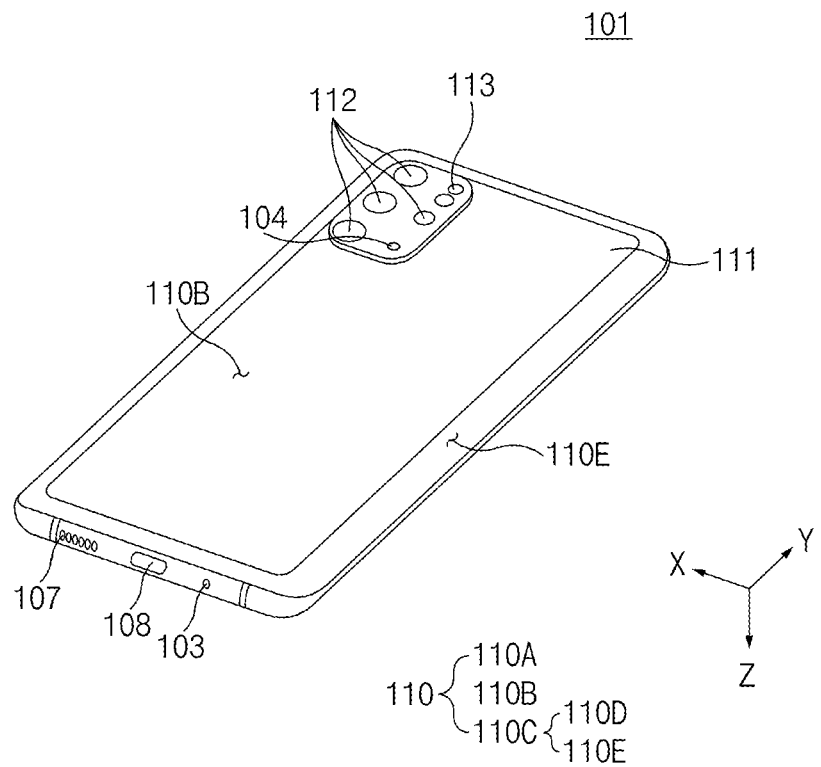
FIG. 1B is a rear perspective view of the electronic device according to various embodiments.

FIG. 1B is a rear perspective view of the electronic device according to various embodiments.

Referring to FIGS. 1A and 1B, the electronic device 101 may include a housing 110 that includes a first surface (or, a front surface) 110A, a second surface (or, a rear surface) 110B, and a side surface 110C surrounding a space between the first surface 110A and the second surface 110B.

In an embodiment (not illustrated), the housing 110 may refer to a structure that forms some of the first surface 110A, the second surface 110B, and the side surface 110C.

In an embodiment, the first surface 110A may be formed by a front plate 102, at least a portion of which is substantially transparent (e.g., a glass plate including various coating layers, or a polymer plate). The second surface 110B may be formed by a back plate 111 that is substantially opaque. The back plate 111 may be formed of, for example, coated or colored glass, ceramic, polymer, metal (e.g., aluminum, stainless steel (STS), or magnesium), or a combination of at least two of the aforementioned materials. The side surface 110C may be formed by a side bezel structure (or, a "frame structure") 118 that is coupled with the front plate 102 and the back plate 111 and that contains metal and/or polymer.

In an embodiment, the back plate 111 and the side bezel structure 118 may be integrally formed with each other and may contain the same material (e.g., a metallic material such as aluminum).

In the illustrated embodiment, the front plate 102 may include two first areas 110D that curvedly and seamlessly extend from partial areas of the first surface 110A toward the back plate 111. The first areas 110D may be located at opposite long edges of the front plate 102.

In the illustrated embodiment, the back plate 111 may include two second areas 110E that curvedly and seamlessly extend from partial areas of the second surface 110B toward the front plate 102. The second areas 110E may be located at opposite long edges of the back plate 111.

In an embodiment, the front plate 102 (or, the back plate 111) may include only one of the first areas 110D (or, the second areas 110E). Furthermore, in an embodiment, the front plate 102 (or, the back plate 111) may not include a part of the first areas 110D (or, the second areas 110E).

In an embodiment, when viewed from a side of the electronic device 101, the side bezel structure 118 may have a first thickness (or, width) at sides (e.g., short sides) not including the first areas 110D or the second areas 110E and may have a second thickness at sides (e.g., long sides) including the first areas 110D or the second areas 110E, the second thickness being less than the first thickness.

Figure 15:
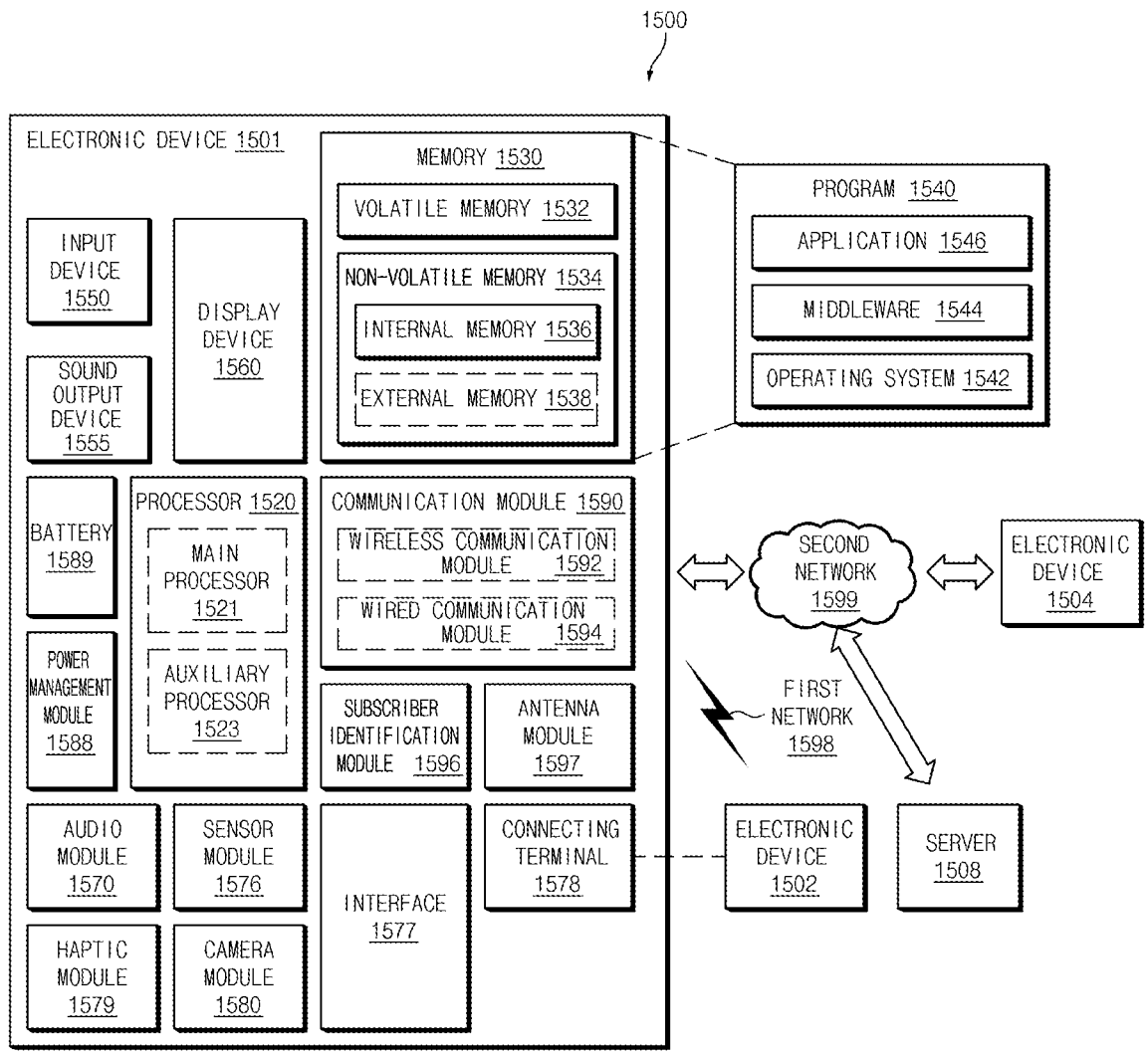
FIG. 15 is a block diagram illustrating an example electronic device in a network environment according to various embodiments.

In an embodiment, the electronic device 101 may include at least one of a display 106, audio modules 103 and 107 (e.g., an audio module 1570 of FIG. 15), a sensor module (not illustrated) (e.g., a sensor module 1576 of FIG. 15), camera modules 105, 112, and 113 (e.g., a camera module 1580 of FIG. 15), key input devices 117 (e.g., an input module 1550 of FIG. 15), a light emitting element (not illustrated), or a connector hole 108 (e.g., a connecting terminal 1578 of FIG. 15). In an embodiment, the electronic device 101 may not include at least one component (e.g., the key input devices 117 or the light emitting element (not illustrated)) among the aforementioned components, or may additionally include other component(s).

In an embodiment, the display 106 may be exposed through most of the front plate 102. For example, at least a portion of the display 106 may be exposed through the front plate 102 that includes the first surface 110A and the first areas 110D of the side surface 110C.

In an embodiment, the periphery of the display 106 may be formed to be substantially the same as the shape of the adjacent outside edge of the front plate 102. In an embodiment (not illustrated), the gap between the periphery of the display 106 and the periphery of the front plate 102 may be substantially constant to expand the area by which the display 106 is exposed.

In an embodiment, a surface of the housing 110 (or, the front plate 102) may include a screen display area that is formed as the display 106 is visually exposed. For example, the screen display area may include the first surface 110A and the first areas 110D of the side surface.

In an embodiment (not illustrated), the screen display area 110A and 110D may include a sensing area (not illustrated) that is configured to obtain biometric information of a user. When the screen display area 110A and 110D includes the sensing area, this may refer, for example, to at least a portion of the sensing area overlapping the screen display area 110A and 110D. For example, the sensing area (not illustrated) may refer to an area capable of displaying visual information by the display 106 like other areas of the screen display area 110A and 110D and additionally obtaining biometric information (e.g., a fingerprint) of the user.

In an embodiment, the screen display area 110A and 110D of the display 106 may include an area through which the first camera module 105 (e.g., a punch hole camera) is visually exposed. For example, at least a portion of the periphery of the area through which the first camera module 105 is exposed may be surrounded by the screen display area 110A and 110D. In an embodiment, the first camera module 105 may include a plurality of camera modules (e.g., the camera module 1580 of FIG. 15).

In an embodiment (not illustrated), the display 106 may be coupled with, or disposed adjacent to, touch detection circuitry, a pressure sensor capable of measuring the intensity (pressure) of a touch, and/or a digitizer that detects a stylus pen of a magnetic field type.

In an embodiment, the audio modules 103, 104, and 107 may include the microphone holes 103 and 104 and the speaker hole 107.

In an embodiment, the microphone holes 103 and 104 may include the first microphone hole 103 formed in a partial area of the side surface 110C and the microphone hole 104 formed in a partial area of the second surface 110B. A microphone for obtaining an external sound may be disposed in the microphone holes 103 and 104. The microphone may include a plurality of microphones to sense the direction of a sound. In an embodiment, the second microphone hole 104 formed in the partial area of the second surface 110B may be disposed adjacent to the camera modules 105, 112, and 113. For example, the second microphone hole 104 may obtain sounds when the camera modules 105, 112, and 113 are executed, or may obtain sounds when other functions are executed.

In an embodiment, the speaker hole 107 may include an external speaker hole 107 and a receiver hole for telephone call (not illustrated). The external speaker hole 107 may be formed in a portion of the side surface 110C of the electronic device 101. In an embodiment, the external speaker hole 107 and the microphone hole 103 may be implemented as a single hole. Although not illustrated, the receiver hole for telephone call (not illustrated) may be formed in another portion of the side surface 110C. For example, the receiver hole for telephone call (not illustrated) may be formed in a portion (e.g., the portion facing the +Y-axis direction) of the side surface 110C that faces the portion (e.g., the portion facing the −Y-axis direction) of the side surface 110C in which the external speaker hole 107 is formed.

In an embodiment, the electronic device 101 may include a speaker in communication with the speaker hole 107. In an embodiment, the speaker may include a piezoelectric speaker that does not have the speaker hole 107.

In an embodiment, the sensor module (not illustrated) (e.g., the sensor module 1576 of FIG. 15) may generate an electrical signal or a data value that corresponds to an operational state inside the electronic device 101 or an environmental state external to the electronic device 101. For example, the sensor module may include at least one of a proximity sensor, an HRM sensor, a fingerprint sensor, a gesture sensor, a gyro sensor, an atmospheric pressure sensor, a magnetic sensor, an acceleration sensor, a grip sensor, a color sensor, an infrared (IR) sensor, a biosensor, a temperature sensor, a humidity sensor, or an illuminance sensor.

In an embodiment, the camera modules 105, 112, and 113 may include the first camera module 105 (e.g., a punch hole camera) exposed on the first surface 110A of the electronic device 101, the second camera module 112 exposed on the second surface 110B, and/or the flash 113.

In an embodiment, the first camera module 105 may be exposed through a portion of the screen display area 110A and 110D of the display 106. For example, the first camera module 105 may be exposed on a partial area of the screen display area 110A and 110D through an opening (not illustrated) that is formed in a portion of the display 106.

In an embodiment, the second camera module 112 may include a plurality of camera modules (e.g., a dual camera, a triple camera, or a quad camera). However, the second camera module 112 is not necessarily limited to including the plurality of camera modules and may include one camera module.

The first camera module 105 and the second camera module 112 may include one or more lenses, an image sensor, and/or an image signal processor. The flash 113 may include, for example, a light emitting diode or a xenon lamp. In an embodiment, two or more lenses (an IR camera lens, a wide angle lens, and a telephoto lens) and image sensors may be disposed on one surface of the electronic device 101.

In an embodiment, the key input devices 117 may be disposed on the side surface 110C (e.g., the first areas 110D and/or the second areas 110E) of the housing 110. In an embodiment, the electronic device 101 may not include all or some of the key input devices 117, and the key input devices 117 not included may be implemented in a different form, such as a soft key, on the display 106. In an embodiment, the key input devices may include a sensor module (not illustrated) that forms the sensing area (not illustrated) that is included in the screen display area 110A and 110D.

In an embodiment, the connector hole 108 may accommodate a connector. The connector hole 108 may be disposed in the side surface 110C of the housing 110. For example, the connector hole 108 may be disposed in the side surface 110c so as to be adjacent to at least a part of the audio modules (e.g., the microphone hole 103 and the speaker hole 107). In an embodiment, the electronic device 101 may include the first connector hole 108 capable of accommodating a connector (e.g., a USB connector) for transmitting/receiving power and/or data with an external device, and/or a second connector hole (not illustrated) capable of accommodating a connector (e.g., an earphone jack) for transmitting/receiving an audio signal with an external device.

In an embodiment, the electronic device 101 may include the light emitting element (not illustrated). For example, the light emitting element (not illustrated) may be disposed on the first surface 110A of the housing 110. The light emitting element (not illustrated) may provide state information of the electronic device 101 in the form of light. In an embodiment, the light emitting element (not illustrated) may provide a light source that operates in conjunction with operation of the camera module 105. For example, the light emitting element (not illustrated) may include an LED, an IR LED, and/or a xenon lamp.

Figure 1C:
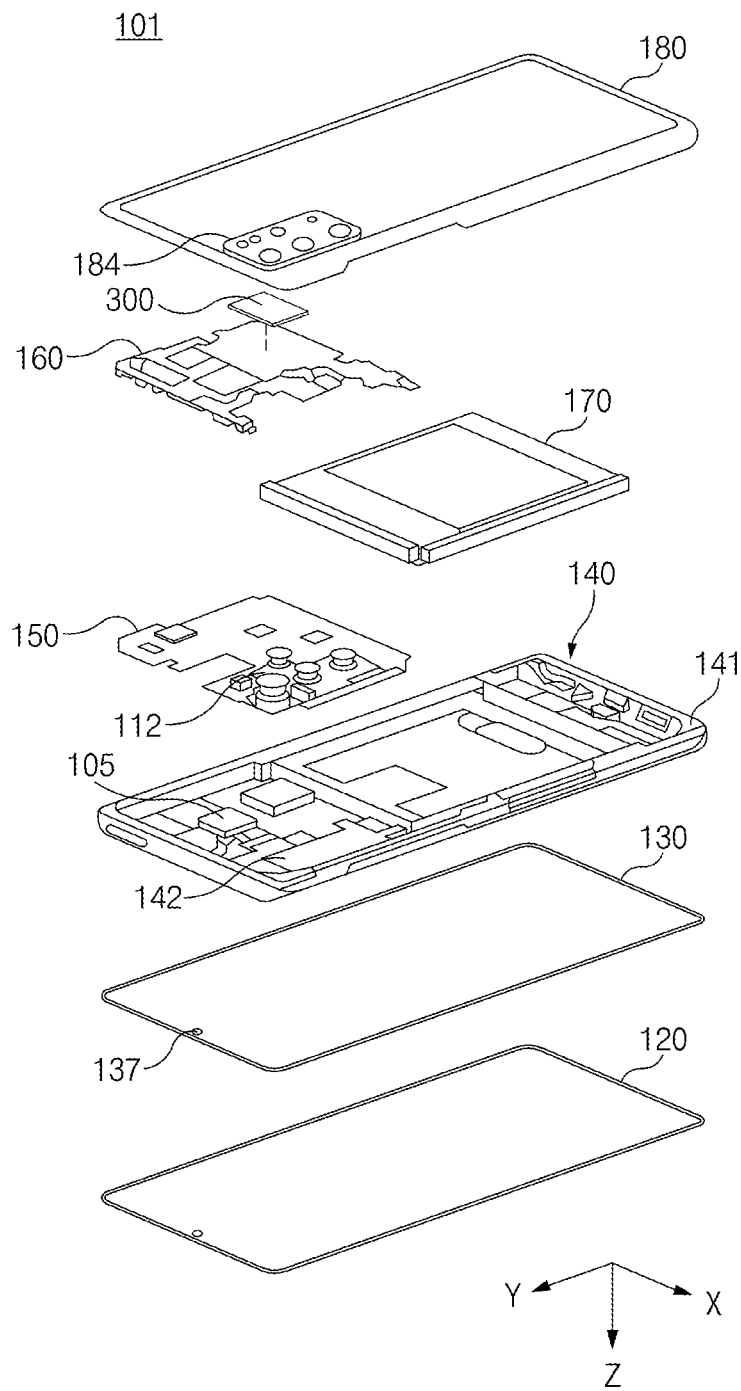
FIG. 1C is an exploded perspective view of the electronic device according to various embodiments.

FIG. 1C is an exploded perspective view of the electronic device according to various embodiments.

Referring to FIG. 1C, the electronic device 101 may include a front plate 120 (e.g., the front surface 110A and the first areas 110D of FIG. 1A), a display 130 (e.g., the display 106 of FIG. 1A), a bracket 140, a battery 170, a printed circuit board 150, a support member 160 (e.g., a rear case), a back plate 180 (e.g., the rear surface 110B and the second areas 110E of FIG. 1A), and a second antenna structure 300.

In an embodiment, the electronic device 101 may not include at least one of the aforementioned components, or may additionally include other component(s). At least one of the components of the electronic device 101 may be identical or similar to at least one of the components of the electronic device 101 of FIGS. 1A and 1B, and repetitive descriptions may not be repeated.

In an embodiment, the front plate 120, the back plate 180, and at least a portion of the bracket 140 (e.g., a frame structure 141) may form a housing (e.g., the housing 110 of FIGS. 1A and 1B).

In an embodiment, the bracket 140 may include the frame structure 141 that forms a surface of the electronic device 101 (e.g., a portion of the side surface 110C of FIG. 1A) and a plate structure 142 that extends from the frame structure 141 toward the inside of the electronic device 101.

The plate structure 142 may be located inside the electronic device 101 and may be connected with the frame structure 141, or may be integrally formed with the frame structure 141. The plate structure 142 may be formed of, for example, a metallic material and/or a nonmetallic (e.g., polymer) material. The display 130 may be coupled to one surface of the plate structure 142, and the printed circuit board 150 may be coupled to an opposite surface of the plate structure 142. The printed circuit board 150 may have a processor, memory, and/or an interface mounted thereon. The processor may include, for example, one or more of a central processing unit, an application processor, a graphic processing unit, an image signal processor, a sensor hub processor, or a communication processor.

The memory may include, for example, a volatile memory or a nonvolatile memory.

The interface may include, for example, a high definition multimedia interface (HDMI), a universal serial bus (USB) interface, an SD card interface, and/or an audio interface. For example, the interface may electrically or physically connect the electronic device 101 with an external device and may include a USB connector, an SD card/MMC connector, or an audio connector.

In an embodiment, the support member 160 may be disposed on the printed circuit board 150. The support member 160 may protect the printed circuit board 150 and the components mounted on the printed circuit board 150, by covering at least a partial area of the printed circuit board 150. In an embodiment, the support member 160 may include a conductive portion (e.g., a plate made of metal such as stainless steel) and/or a non-conductive portion (e.g., an injection-molded resin). In an embodiment, when the support member 160 at least partially contains metal, the support member 160 may shield electromagnetic waves transferred from (or, to) the components disposed on the printed circuit board 150.

In an embodiment, the second antenna structure 300 may be disposed on the support member 160 and may be located between the support member 160 and the back plate 180. In an embodiment, the second antenna structure 300 may be disposed on the printed circuit board 150.

In an embodiment, the battery 170 may supply power to at least one of the components of the electronic device 101. For example, the battery 170 may include a primary cell that is not rechargeable, a secondary cell that is rechargeable, or a fuel cell. In an embodiment, at least a portion of the battery 170 may be disposed on substantially the same plane as the printed circuit board 150. In an embodiment, the battery 170 may be integrally disposed inside the electronic device 101, or may be disposed so as to be detachable from the electronic device 101.

In an embodiment, the first camera module 105 may be disposed on the plate structure 142 of the bracket 140 such that a lens is exposed through a partial area of the front plate 120 (e.g., the front surface 110A of FIG. 1A) of the electronic device 101.

In an embodiment, the first camera module 105 may be disposed such that the optical axis of the lens is at least partially aligned with a hole or recess 137 formed in the display 130. For example, the area through which the lens is exposed may be formed in the front plate 120. For example, the first camera module 105 may include a punch hole camera, at least a portion of which is disposed in the hole or recess 137 formed in the rear surface of the display 130.

In an embodiment, the second camera module 112 may be disposed on the printed circuit board 150 such that a lens is exposed through a camera area 184 of the back plate 180 (e.g., the rear surface 110B of FIG. 1B) of the electronic device 101.

In an embodiment, the camera area 184 may be formed in a surface (e.g., the rear surface 110B of FIG. 1B) of the back plate 180. In an embodiment, the camera area 184 may be formed to be at least partially transparent such that external light is incident on the lens of the second camera module 112. In an embodiment, at least a portion of the camera area 184 may protrude to a predetermined height from the surface of the back plate 180. However, without being necessarily limited thereto, the camera area 184 may form substantially the same plane as the surface of the back plate 180.

Figure 2:
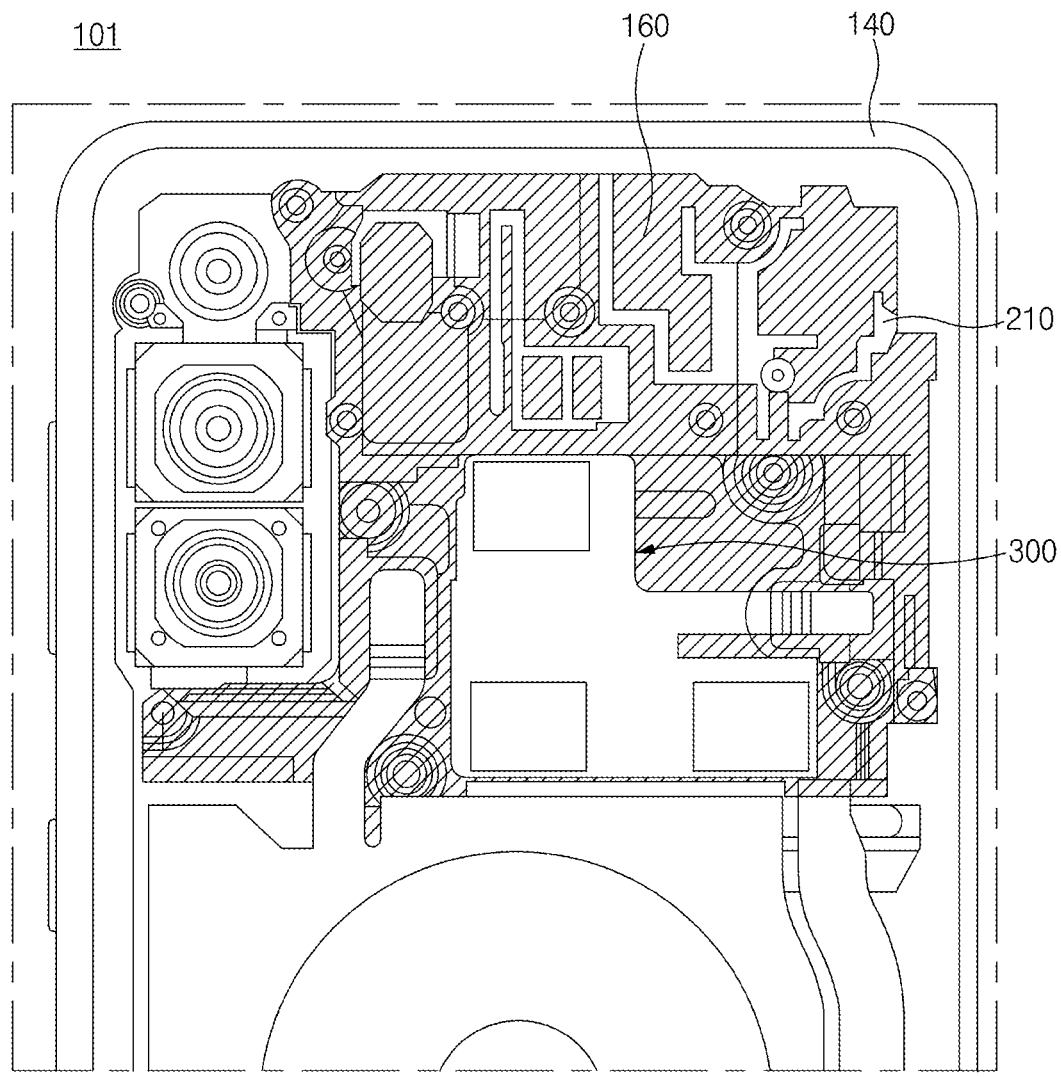
FIG. 2 is a diagram illustrating an inside of the electronic device according to various embodiments

FIG. 2 is a diagram illustrating an inside of the electronic device according to various embodiments.

Referring to FIG. 2, the electronic device 101 according to an embodiment may include a first antenna 210 and the second antenna (or, the second antenna structure) 300.

In an embodiment, the first antenna 210 may be formed on the support member (e.g., support) 160. For example, the support member 160 may include an injection-molded non-conductive portion (e.g., a resin), and the first antenna 210 may include a conductive pattern formed on the non-conductive portion of the support member 160 by laser direct structuring (LDS). The conductive pattern may operate as a radiating element of the first antenna 210.

In an embodiment, the second antenna 300 may be disposed on the support member 160. For example, the support member 160 may include a conductive portion (e.g., a plate made of metal such as stainless steel), and the second antenna 300 may be attached to the conductive portion. In an embodiment, the second antenna 300 may include conductive patches. The conductive patches may be electrically connected with a UWB integrated circuit (UWB IC) (e.g., a UWB IC 592 of FIG. 5) through an electrical path provided by the printed circuit board 150.

Figure 3:
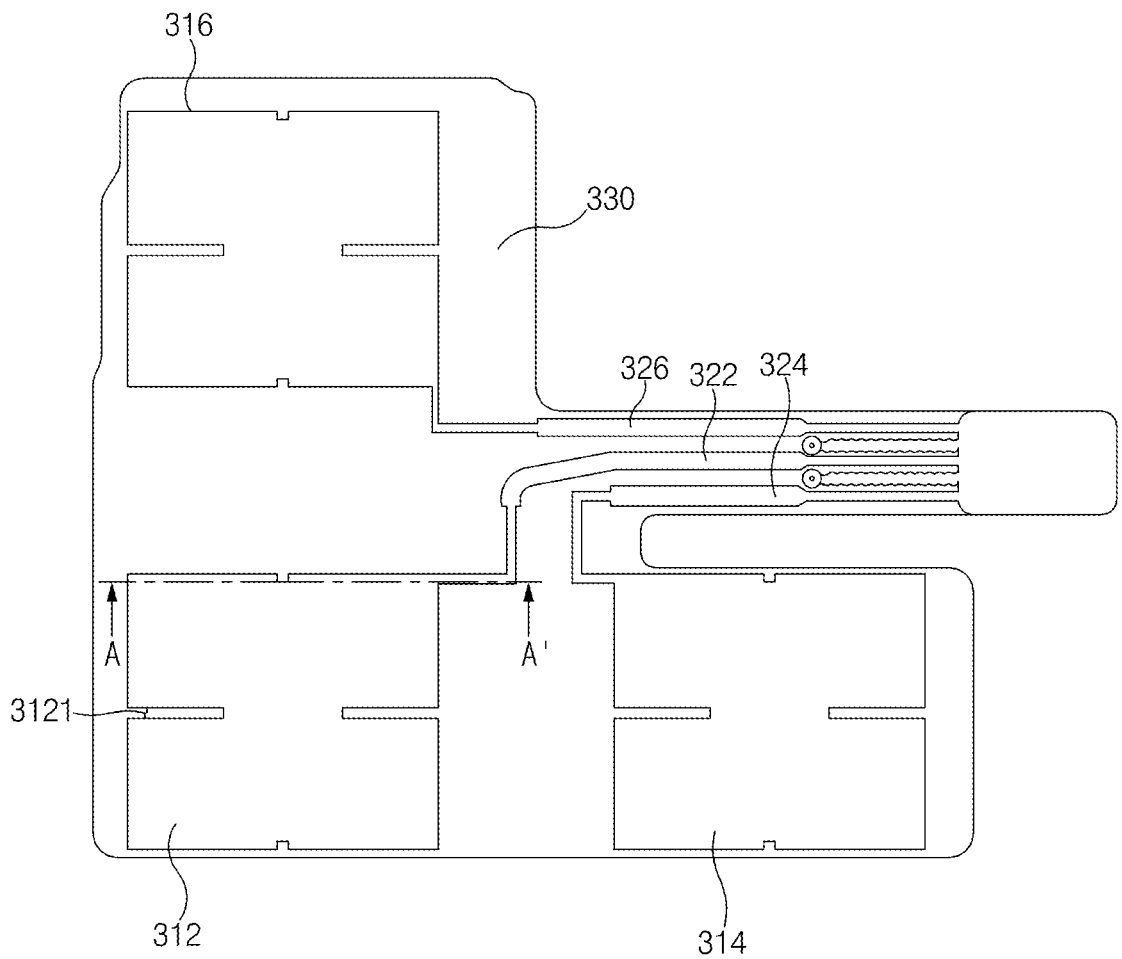
FIG. 3 is a diagram illustrating a second antenna according to various embodiments.

FIG. 3 is a diagram illustrating the second antenna 300 according to various embodiments.

Figure 4:
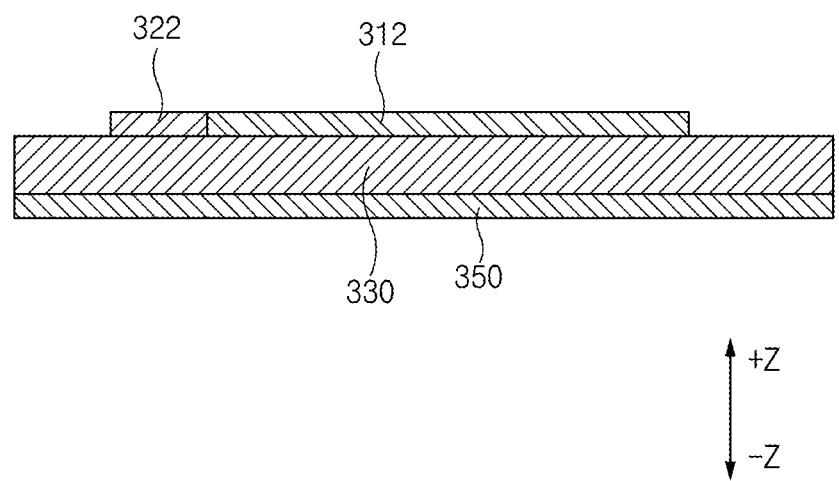
FIG. 4 is a sectional view taken along line A-A' of FIG. 3 according to various embodiments.

FIG. 4 is a sectional view taken along line A-A' of FIG. 3 according to various embodiments.

Referring to FIGS. 3 and 4, the second antenna 300 according to an embodiment may include a first conductive patch 312, a second conductive patch 314, a third conductive patch 316, a first transmission line 322, a second transmission line 324, a third transmission line 326, a dielectric substance 330, and a ground 350.

In an embodiment, the first conductive patch 312, the second conductive patch 314, and the third conductive patch 316 may be disposed on the dielectric substance 330. In an embodiment, the first conductive patch 312, the second conductive patch 314, and the third conductive patch 316 may be spaced apart from one another. In an embodiment, the first conductive patch 312, the second conductive patch 314, and the third conductive patch 316 may contain a conductive material such as metal foil (e.g., copper). In an embodiment, the first conductive patch 312, the second conductive patch 314, and the third conductive patch 316 may be referred to as conductive patterns formed on the dielectric substance 330.

In an embodiment, at least one of the first conductive patch 312, the second conductive patch 314, and/or the third conductive patch 316 may include at least one slit extending inward from an outside edge thereof. For example, the first conductive patch 312 may include at least one slit 3121 extending inward from an edge thereof.

In an embodiment, the first conductive patch 312 and the second conductive patch 314 may be at least partially aligned with each other on the dielectric substance 330 along a first direction. In an embodiment, the first conductive patch 312 and the second conductive patch 314 may be at least partially aligned with each other on the dielectric substance 330 in a second direction different from the first direction (e.g., in a direction orthogonal to the first direction, but are not limited thereto).

In an embodiment, the first transmission line 322, the second transmission line 324, and the third transmission line 326 may be disposed (or, formed) on the dielectric substance 330. In an embodiment, the first transmission line 322, the second transmission line 324, and the third transmission line 326 may contain a conductive material (e.g., copper). In an embodiment, the first transmission line 322, the second transmission line 324, and the third transmission line 326 may be electrically connected with the first conductive patch 312, the second conductive patch 314, and the third conductive patch 316, respectively. In an embodiment, the first conductive patch 312 and a UWB IC (e.g., the UWB IC 592 of FIG. 5) may be electrically connected through the first transmission line 322. In an embodiment, the second conductive patch 314 and the UWB IC may be electrically connected through the second transmission line 324. In an embodiment, the third conductive patch 316 and the UWB IC may be electrically connected through the third transmission line 326. In an embodiment, at least one of the first transmission line 322, the second transmission line 324, and the third transmission line 326 may have a double layer structure including a first line formed on the dielectric substance 330 and connected with a conductive patch and a second line extending in the dielectric substance 330 and overlapping the first line, but is not limited thereto.

In an embodiment, the dielectric substance 330 may be disposed between the conductive patches 312, 314, and 316 and the ground 350. The dielectric substance 330 may contain a material having a specified permittivity, for example, modified polyimide, but is not limited thereto. In an embodiment, the permittivity and thickness of the dielectric substance 330 may be determined depending on required radiation characteristics (e.g., radiation efficiency and bandwidth) of an antenna.

In an embodiment, the ground 350 may be disposed (or, formed) on a lower surface of the dielectric substance 330. In an embodiment, the ground 350 may contain a conductive material such as metal. For example, the ground 350 may include a conductive metal having a substantially plate shape. In an embodiment, the ground 350 may be spaced apart from the conductive patches 312, 314, and 316 and may be substantially parallel to the conductive patches 312, 314, and 316.

Figure 5:
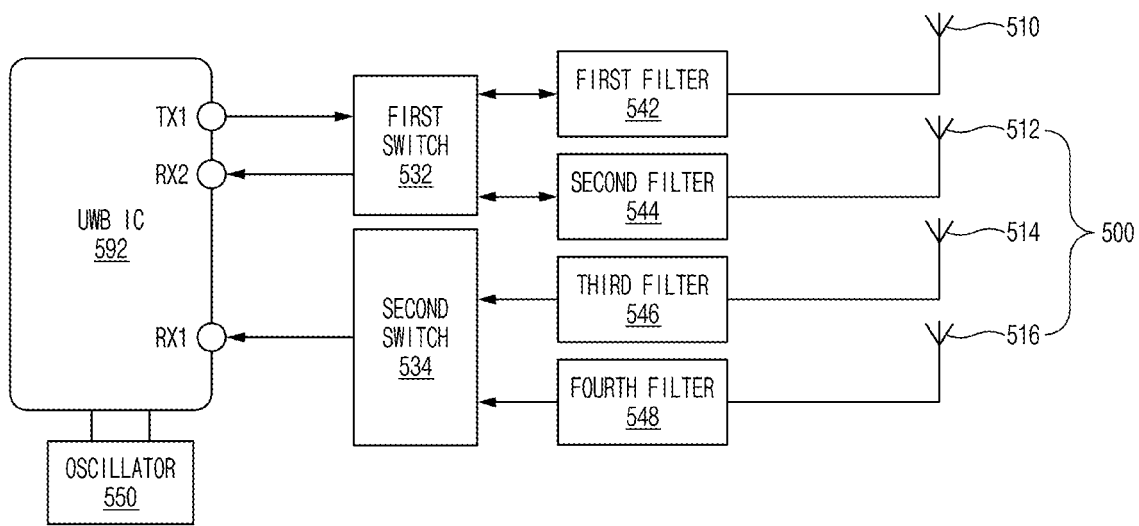
FIG. 5 is a block diagram illustrating an example configuration of an electronic device according to various embodiments.

FIG. 5 is a block diagram illustrating an example configuration of an electronic device according to various embodiments.

Figure 6:
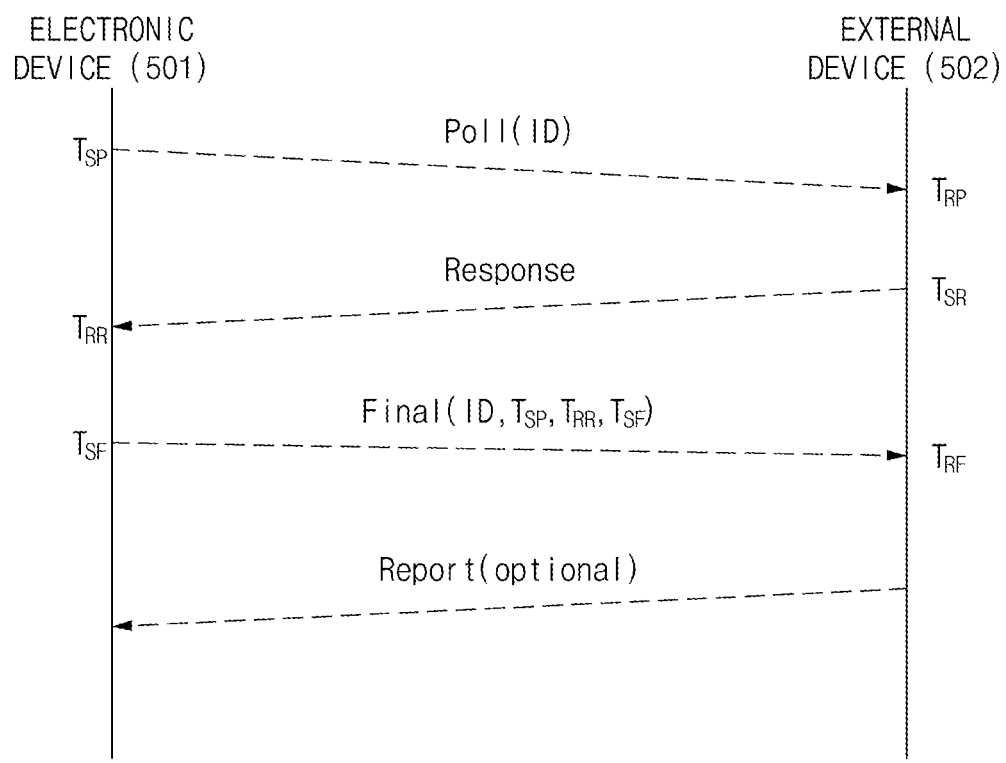
FIG. 6 is a signal flow diagram illustrating an example method of measuring, by the electronic device, a distance to an external device according to various embodiments.

FIG. 6 is a signal flow diagram illustrating an example method of measuring, by the electronic device, a distance to an external device according to various embodiments.

Figure 7:
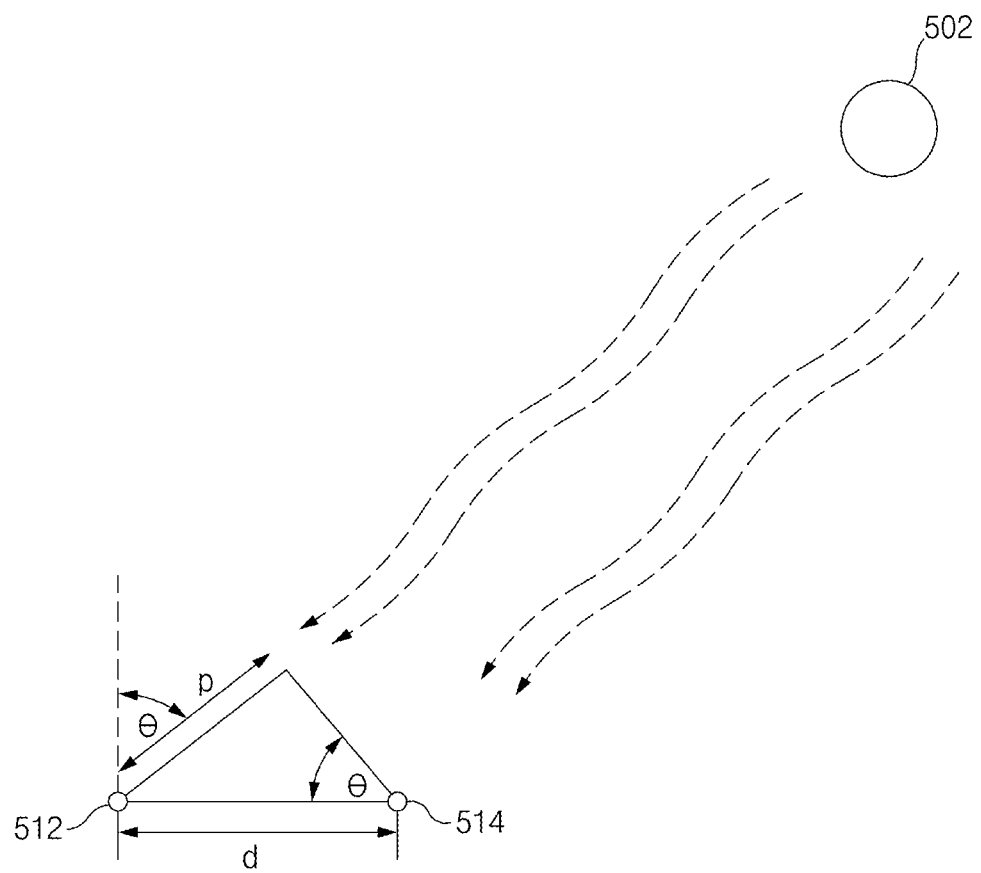
FIG. 7 is a diagram illustrating an example method of measuring, by the electronic device, an angle of arrival with the external device according to various embodiments.

FIG. 7 is a diagram illustrating an example method of measuring, by the electronic device, an angle of arrival with the external device according to various embodiments.

Referring to FIG. 5, the electronic device 501 according to an embodiment (e.g., the electronic device 101 of FIG. 2) may include a first antenna 510, a second antenna 500, a first switch 532, a second switch 534, a first filter 542, a second filter 544, a third filter 546, a fourth filter 548, an oscillator 550, and the UWB IC 592.

In an embodiment, the first antenna 510 (e.g., the first antenna 210 of FIG. 2) may be connected to the first filter 542. In an embodiment, the first filter 542 may filter a signal transmitted or received from the first antenna 510, with a specified frequency band as a pass band. In an embodiment, the first filter 542 may be connected with the first switch 532, and the first switch 532 may be connected with the UWB IC 592. In an embodiment, the first switch 532 may include, for example, a double pole double throw (DPDT) switch.

In an embodiment, the second antenna 500 (e.g., the second antenna 300 of FIG. 3) may include a first conductive patch 512, a second conductive patch 514, and a third conductive patch 516 as radiating elements.

In an embodiment, the first conductive patch 512 (e.g., the first conductive patch 312 of FIG. 3) may be connected with the second filter 544, and the second filter 544 may be connected with the first switch 532. In an embodiment, the second filter 544 may filter a signal transmitted or received from the first conductive patch 512, with a first specified frequency band as a pass band. In an embodiment, the first antenna 510 or the first conductive patch 512 may be selectively connected to a TX1 port or an RX2 port of the UWB IC 592 through the first switch 532. In an embodiment, the first switch 532 may be controlled by the UWB IC 592.

In an embodiment, the second conductive patch 514 (e.g., the second conductive patch 314 of FIG. 3) may be connected with the third filter 546, and the third filter 546 may be connected with the second switch 534. In an embodiment, the third filter 546 may filter a signal received from the second conductive patch 514, with the first specified frequency band as a pass band.

In an embodiment, the third conductive patch 516 (e.g., the third conductive patch 316 of FIG. 3) may be connected with the fourth filter 548, and the fourth filter 548 may be connected with the second switch 534. In an embodiment, the fourth filter 548 may filter a signal received from the third conductive patch 516, with the first specified frequency band as a pass band.

In an embodiment, the second switch 534 may be connected to the UWB IC 592. In an embodiment, the second switch 534 may include, for example, a single pole double throw (SPDT) switch. In an embodiment, the second conductive patch 514 or the third conductive patch 516 may be selectively connected to an RX1 port of the UWB IC 592 through the second switch 534. In an embodiment, the second switch 534 may be controlled by the UWB IC 592.

In an embodiment, the oscillator 550 may be connected with the UWB IC 592. In an embodiment, the UWB IC 592 may generate a UWB signal, based on a signal provided from the oscillator 550.

In an embodiment, the UWB IC 592 (e.g., a wireless communication module 1592 of FIG. 15) may transmit and/or receive an RF signal of the first specified band using the first antenna 510 and the second antenna 500. For example, the UWB IC 592 may transmit the RF signal of the first specified band using the first antenna 510. For example, the UWB IC 592 may transmit or receive the RF signal of the first specified band using the first conductive patch 512 of the second antenna 500. For example, the UWB IC 592 may receive the RF signal of the first specified band using the second conductive patch 514 or the third conductive patch 516 of the second antenna 500. The RF signal of the first specified band may include, for example, a UWB signal transferred in the UWB frequency band (e.g., a frequency band having a center frequency of 6 GHz or 8 GHz). The UWB signal may be based on an impulse radio scheme. The UWB signal may have a specified bandwidth, for example, a bandwidth of 499 MHz or a bandwidth of 500 MHz or more. However, the disclosure is not limited thereto. In an embodiment, the first antenna 510 may be an antenna for measuring (ranging) the distance to the external device, and the second antenna 500 may be an antenna for measuring the angle of arrival of an RF signal received from the external device.

In an embodiment, the UWB IC 592 may include processing circuitry for controlling at least some components (e.g., the first antenna 510, the second antenna 500, the first switch 532, and the second switch) among the components illustrated in FIG. 5. The processing circuitry may include at least one processor. In an embodiment, at least part of the UWB IC 592 may be integrated into a processor 1520 of FIG. 15. In this case, the processor 1520 may perform at least some of the functions of the UWB IC 592.

In an embodiment, some of the components illustrated in FIG. 5 may be integrated with the UWB IC 592. For example, at least one of the first switch 532, the second switch 534, the first filter 542, the second filter 544, the third filter 546, the fourth filter 548, and/or the oscillator 550 may be integrated into the UWB IC 592. In this case, the UWB IC 592 may substantially identically perform the function of at least one of the first switch 532, the second switch 534, the first filter 542, the second filter 544, the third filter 546, the fourth filter 548, and/or the oscillator 550.

In an embodiment, the UWB IC 592 may detect the position of the external device, based on an RF signal transmitted and received using the first antenna 510 and the second antenna 500. The external device may include, for example, various devices capable of wireless communication. For example, the external device may include, but is not limited to, a laptop computer, a tablet computer, a mobile phone, an electronic watch, a headphone, a wearable device, such as earbuds, or a car capable of wireless communication.

Hereafter, a method of detecting, by the electronic device 501, the position of the external device will be described with reference to FIGS. 5, 6, and 7.

Referring to FIGS. 5 and 6, the UWB IC 592 according to an embodiment may measure the distance between the electronic device 501 and an external device 502, based on an RF signal transmitted and received from the external device 502. For example, the UWB IC 592 may transmit and receive a message including time stamp information with the external device 502. For example, the UWB IC 592 may transmit at least one request message including information about an identifier ID and transmission time $T_{SP}$ to the external device 502 using the first antenna 510 or the first conductive patch 512 of the second antenna 500. The external device 502 may transmit at least one response message to the electronic device 501 in response to receiving the at least one request message. The UWB IC 592 may receive the at least one response message using the first antenna 510 and/or the second antenna 500. The at least one response message may include information about the reception time $T_{RP}$ of the at least one request message (poll) and the transmission time $T_{SR}$ of the at least one response message. The UWB IC 592 may determine the round trip time (RTT) (e.g., $T_{RR}-T_{SP}$) spent receiving the at least one response message after transmitting the at least one request message. The UWB IC 592 may determine the reply time (e.g., $T_{SR}-T_{RP}$) spent transmitting the at least one response message after receiving the at least one request message. Based on the RTT and the reply time, the UWB IC 592 may determine the time of flight (TOF) (e.g., (RTT−reply time)÷2=$(T_{RR}-T_{SP}-T_{SR}+T_{RP})$÷2) that is the time taken by a radio wave to reach the external device 502 after transmitted from the electronic device 501. The UWB IC 592 may measure the distance between the electronic device 501 and the external device 502 (e.g., the TOF×the speed of the radio wave), based on the TOF.

Referring to FIG. 7, in an embodiment, the UWB IC 592 may measure the angle of arrival (AOA) of an RF signal received from the external device 502, using the second antenna 500. For example, the UWB IC 592 may determine the angle of arrival of the signal received from the external device 502, based on the phase difference of arrival (PDOA) between RF signals received by the first conductive patch 512 and the second conductive patch 514 of the second antenna 500, respectively, the wavelength of the received RF signal, and the distance between the first conductive patch 512 and the second conductive patch 514. For example, the angle of arrival may be determined using Equations 1 to 4 below.

$$p = d \sin(\theta) \quad \text{[Equation 1]}$$

In Equation 1, "p" may be the difference in path length between the RF signals received by the first conductive patch 512 and the second conductive patch 514, respectively. In Equation 1, "d" may be the physical distance between the first conductive patch 512 and the second conductive patch 514. In Equation 1, "θ" may be the angle of arrival of the RF signal received from the external device 502.

The wavelength of the RF signal received by the first conductive patch 512 and the second conductive patch 514 may be expressed by Equation 2 below.

$$\lambda = \frac{2\pi c}{f} \quad \text{[Equation 2]}$$

In Equation 2, "λ" may be the wavelength of the RF signal, "f" may be the frequency of the RF signal, and "c" may be the speed of light that is the speed of a radio wave in free air.

The phase difference of arrival between the RF signals received by the first conductive patch 512 and the second conductive patch 514, respectively, may be expressed by Equation 3 below using Equation 2 and the path length difference "p".

$$\alpha = \frac{2\pi}{\lambda} p = \frac{f}{c} p \quad \text{[Equation 3]}$$

In Equation 3, "α" may be the phase difference of arrival between the RF signals received by the first conductive patch 512 and the second conductive patch 514.

The angle of arrival "θ" of the RF signal received from the external device 502 may be expressed by Equation 4 below using Equation 1 and Equation 3.

$$\theta = \sin^{-1} \frac{\alpha \lambda}{2\pi d} \quad \text{[Equation 4]}$$

Referring to Equation 1, to measure the angle of arrival of an RF signal received from the external device located in an angle range of −90 degrees to +90 degrees with respect to the electronic device 501, the distance "d" between the first conductive patch 512 and the second conductive patch 514 may have to be less than or equal to half λ/2 of the wavelength of the RF signal. When the distance "d" between the first conductive patch 512 and the second conductive patch 514 exceeds half λ/2 of the wavelength of the RF signal, the phase difference of arrival "α" and the angle of arrival "θ" may not be mapped with each other in a one-to-one manner in the range of −90 degrees to +90 degrees. Even when the distance "d" between the first conductive patch 512 and the second conductive patch 514 is less than or equal to half λ/2 of the wavelength of the RF signal, the accuracy in measuring the angle of arrival "θ" may be lowered with a decrease in the distance "d" between the first conductive patch 512 and the second conductive patch 514.

The UWB IC 592 according to an embodiment may determine the direction (or, azimuth angle) of the external device 502, based on the angle of arrival "θ" of the RF signal received from the external device 502 and information about the magnetic north direction. The information about the magnetic north direction may be obtained using, for example, at least one sensor (e.g., the sensor module 1576 of FIG. 15) such as a terrestrial magnetism sensor of the electronic device 501. In an embodiment, the UWB IC 592 may determine the position of the external device 502, based on the direction of the external device 502 and the distance to the external device 502.

However, a method of detecting, by the UWB IC 592, the position of the external device 502 is not limited by the above-described example, and various methods may be applied.

Figure 8A:
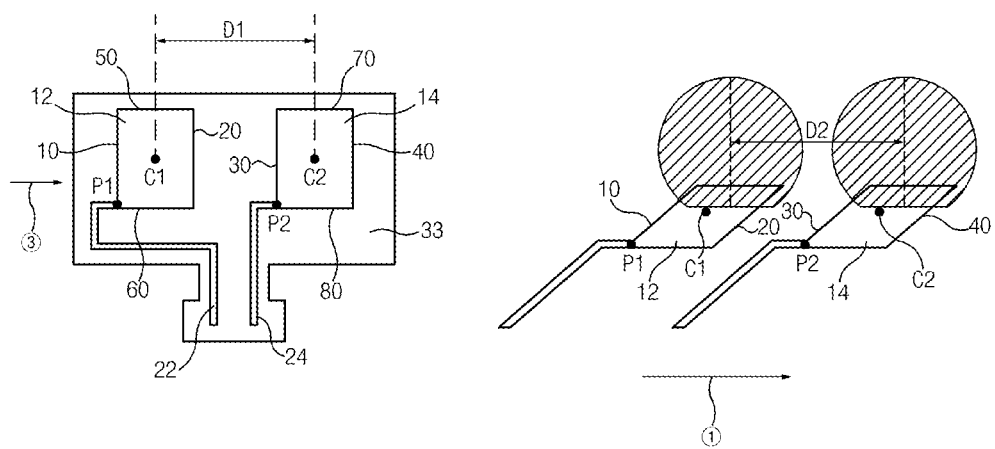
FIG. 8A is a diagram illustrating an example antenna structure and phase patterns formed by the antenna structure according to various embodiments.

FIG. 8A is a diagram illustrating an example antenna structure and phase patterns formed by the antenna structure according to various embodiments.

Figure 8B:
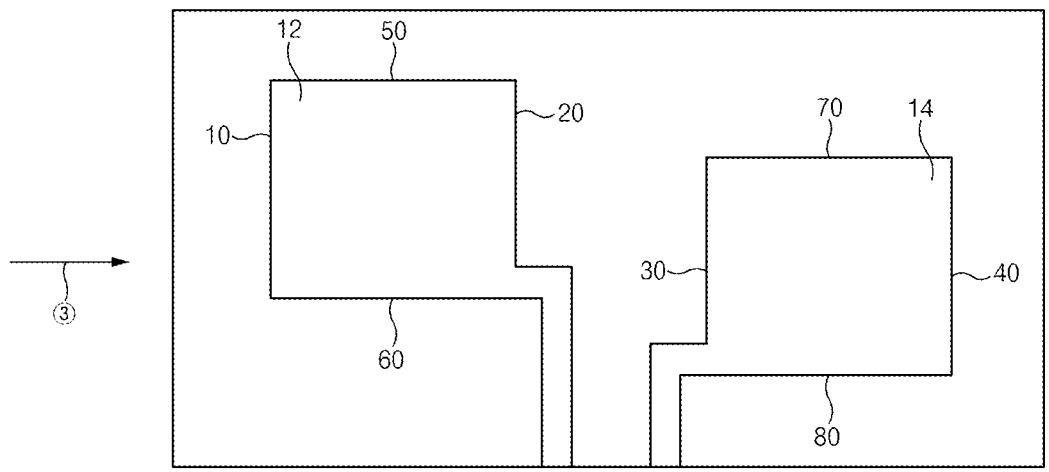
FIG. 8B illustrates an antenna structure according to another embodiment.

FIG. 8B is a diagram illustrating an example antenna structure according to various embodiments.

Figure 8C:
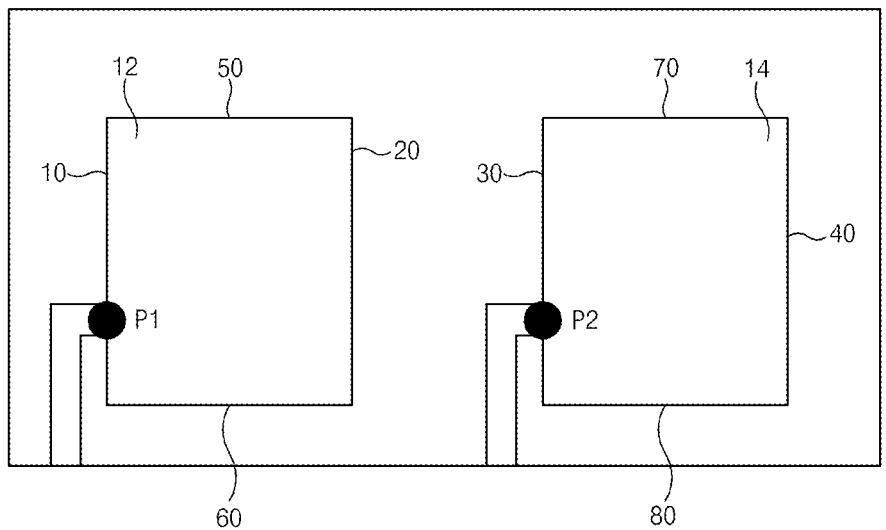
FIG. 8C is a diagram illustrating an example antenna structure according to various embodiments.

FIG. 8C is a diagram illustrating an example antenna structure according to various embodiments.

Figure 8D:
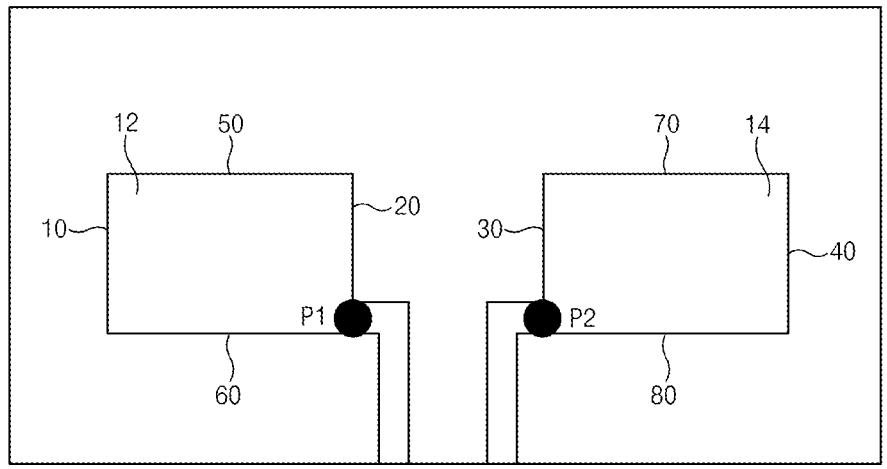
FIG. 8D is a diagram illustrating an example antenna structure according to various embodiments.

FIG. 8D is a diagram illustrating an example antenna structure according to various embodiments.

Referring to FIG. 8A, the antenna structure 800 according to the an embodiment (e.g., the antenna structure 500 of FIG. 5) may include a first conductive patch 12 and a second conductive patch 14 that are disposed on one surface of a dielectric substance 33. Although not illustrated, a ground (e.g., the ground 350 of FIG. 4) may be disposed on an opposite surface of the dielectric substance 33.

In an embodiment, the first conductive patch 12 (e.g., the first conductive patch 512 of FIG. 5) may include a first edge 10 and a second edge 20 parallel to the first edge 10.

In an embodiment, the second conductive patch 14 (e.g., the second conductive patch 514 or the third conductive patch 516 of FIG. 5) may include a third edge 30 and a fourth edge 40 parallel to the third edge 30.

In an embodiment, the first conductive patch 12 may include a fifth edge 50 extending from one end of the first edge 10 to one end of the second edge 20 and a sixth edge 60 extending from an opposite end of the first edge 10 to an opposite end of the second edge 20. In an embodiment, the sixth edge 60 may be substantially parallel to the fifth edge 50.

In an embodiment, the second conductive patch 14 may include a seventh edge 70 extending from one end of the third edge 30 to one end of the fourth edge 40 and an eighth edge 80 extending from an opposite end of the third edge 30 to an opposite end of the fourth edge 40. In an embodiment, the eighth edge 80 may be substantially parallel to the seventh edge 70.

In an embodiment, the second edge 20 of the first conductive patch 12 and the third edge 30 of the second conductive patch 14 may at least partially face each other. For example, when viewed in a third direction ③ parallel to the fifth edge 50 and perpendicular to the second edge 20, the second edge 20 of the first conductive patch 12 and the third edge 30 of the second conductive patch 14 may entirely overlap each other. For example, when viewed in the third direction ③ that is perpendicular to the second edge 20 on substantially the same plane as the first conductive patch 12 and/or the second conductive patch 14, the second edge 20 of the first conductive patch 12 and the third edge 30 of the second conductive patch 14 may entirely overlap each other. In an embodiment, referring to FIG. 8B, the second edge 20 of the first conductive patch 12 and the third edge 30 of the second conductive patch 14 may partially face each other. For example, when viewed in the third direction ③, the second edge 20 of the first conductive patch 12 and the third edge 30 of the second conductive patch 14 may partially overlap each other.

In an embodiment, the first conductive patch 12 and/or the second conductive patch 14 may have a substantially rectangular or square shape. For example, as illustrated in FIG. 8A, the first conductive patch 12 and the second conductive patch 14 may have a rectangular shape. In another example, as illustrated in FIG. 8B, the first conductive patch 12 and the second conductive patch 14 may have a square shape. In an embodiment, the first conductive patch 12 and the second conductive patch 14 may have substantially the same area, but are not limited thereto. In an embodiment, the shapes and/or areas of the first conductive patch 12 and/or the second conductive patch 14 may vary depending on characteristics (e.g., the frequency band or the polarization characteristics) of an RF signal to be received.

Referring to FIG. 8C, in an embodiment, the second edge 20 of the first conductive patch 12 may be longer than the fifth edge 50, and the third edge 30 of the second patch 14 may be longer than the seventh edge 70. In an embodiment, referring to FIG. 8D, the second edge 20 of the first conductive patch 12 may be shorter than the fifth edge 50, and the third edge 30 of the second patch 14 may be shorter than the seventh edge 70. In other words, when the first conductive patch 12 and the second conductive patch 14 have a rectangular shape, the long edges of the first conductive patch 12 and the second conductive patch 14 may face each other as illustrated in FIG. 8A, and the short edges of the first conductive patch 12 and the second conductive patch 14 may face each other as illustrated in FIG. 8D.

In an embodiment, the first conductive patch 12 and the second conductive patch 14 may be spaced apart from each other. In an embodiment, the distance between the center C1 of the first conductive patch 12 and the center C2 of the second conductive patch 14 may be a specified distance D1. The specified distance D1 may refer, for example, to the distance between line segments that pass through the centers of the first conductive patch 12 and the second conductive patch 14, respectively, and that are parallel to the second edge 20.

In an embodiment, the antenna structure 800 may include a first transmission line 22 and a second transmission line 24 disposed on the one surface of the dielectric substance 33 and electrically connected with the first conductive patch 12 and the second conductive patch 14, respectively.

In an embodiment, a UWB IC (e.g., the UWB IC 592 of FIG. 5, hereinafter referred to as the UWB IC 592) may be electrically connected to a first point P1 of the first conductive patch 12 through the first transmission line 22.

In an embodiment, the UWB IC 592 may be electrically connected to a second point P2 of the second conductive patch 14 through the second transmission line 24.

In an embodiment, the UWB IC 592 may transmit and/or receive an RF signal (e.g., the RF signal of the first specified band) using the first conductive patch 12 and the second conductive patch 14. For example, the UWB IC 592 may transmit and/or receive the RF signal by supplying power to the first point P1 of the first conductive patch 12 and/or the second point P2 of the second conductive patch 14.

In an embodiment, the first point P1 of the first conductive patch 12 may be located on the first edge 10, and the second point P2 of the second conductive patch 14 may be located on the third edge 30. For example, the first point P1 of the first conductive patch 12 may be located at the opposite end of the first edge 10 (or, on the corner of the first conductive patch 12 that the first edge 10 and the sixth edge 60 form). In another example, the first point P1 of the first conductive patch 12 may be located at the one end of the first edge 10 (or, on the corner of the first conductive patch 12 that the first edge 10 and the fifth edge 50 form). In another example, referring to FIG. 8C, the first point P1 of the first conductive patch 12 may be located between the one end and the opposite end of the first edge 10. For example, the second point P2 of the second conductive patch 14 may be located at the one end or the opposite end of the third edge 30 or between the one end and the opposite end of the third edge 30.

In an embodiment, the distance between the first point P1 and the second point P2 may be substantially the same as the specified distance D1 between the first conductive patch 12 and the second conductive patch 14, but is not limited thereto.

In an embodiment, when the first point P1 and the second point P2 are located on the first edge 10 and the third edge 30 that face the same direction, the distance D2 between the centers of phase patterns formed by the first conductive patch 12 and the second conductive patch 14 may be substantially the same as the specified distance D1.

In an embodiment, the center of the phase pattern formed by the first conductive patch 12 may be moved in the direction (e.g., the first direction ①) from the first edge 10, on which the first point P1 is located, toward the second edge 20 on the opposite side. In an embodiment, the center of the phase pattern formed by the first conductive patch 12 may be located between the center C1 and the second edge 20. In an embodiment, the center of the phase pattern formed by the second conductive patch 14 may be moved in the direction (e.g., the first direction ①) from the third edge 30, on which the second point P2 is located, toward the fourth edge 40 on the opposite side. In an embodiment, the center of the phase pattern formed by the second conductive patch 14 may be located between the center C2 and the fourth edge 40.

In an embodiment, the distance between the centers of the phase patterns formed by the first conductive patch 12 and the second conductive patch 14 may vary depending on the positions of the first point P1 of the first conductive patch 12 and the second point P2 of the second conductive patch 14. In an embodiment, the distance between the centers of the phase patterns formed by the first conductive patch 12 and the second conductive patch 14 may vary depending on whether the first point P1 and the second point P2 are located on edges of the first conductive patch 12 and the second conductive patch 14 that face the same direction or on edges of the first conductive patch 12 and the second conductive patch 14 that face opposite directions. A more detailed description will be given below with reference to FIGS. 9, 10 and 11.

The descriptions of the first conductive patch 12 and the second conductive patch 14, which are provided with reference to FIGS. 8A, 8B, 8C and 8D, may be substantially identically applied to the first conductive patch 512 and the second conductive patch 514 of FIG. 5.

The descriptions of the first conductive patch 12 and the second conductive patch 14, which are provided with reference to FIGS. 8A to 8D, may be substantially identically applied to the first conductive patch 512 and the third conductive patch 516 of FIG. 5.

Figure 9:
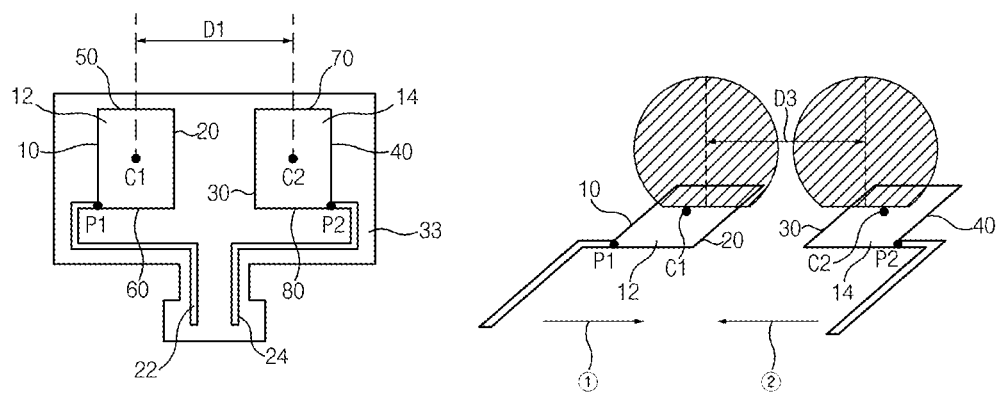
FIG. 9 is a diagram illustrating an example antenna structure and phase patterns formed by the antenna structure according to various embodiments.

FIG. 9 is a diagram illustrating an example antenna structure and phase patterns formed by the antenna structure according to various embodiments.

The descriptions of the antenna structure 800 provided with reference to FIGS. 8A, 8B, 8C and 8D may be substantially identically, similarly, or correspondingly applied to description of the antenna structure 900 of FIG. 9.

Hereinafter, the difference from the antenna structure 800 of FIG. 8A will be described for the antenna structure 900.

Referring to FIG. 9, the first point P1 of the first conductive patch 12 according to an embodiment may be located on the first edge 10, and the second point P2 of the second conductive patch 14 may be located on the fourth edge 40.

In an embodiment, the distance between the first point P1 and the second point P2 may be greater than the specified distance D1 between the first conductive patch 12 and the second conductive patch 14.

In an embodiment, the distance between the centers of phase patterns formed by the first conductive patch 12 and the second conductive patch 14 may vary depending on the positions of the first point P1 of the first conductive patch 12 and the second point P2 of the second conductive patch 14. In an embodiment, when the first point P1 and the second point P2 are located on the first edge 10 and the fourth edge 40 that face opposite directions, the distance D3 between the centers of the phase patterns formed by the first conductive patch 12 and the second conductive patch 14 may be less than the specified distance D1. As described above with reference to FIG. 8A, the distance D2 between the centers of the phase patterns may be substantially the same as the specified distance D1 when the first point P1 and the second point P2 are located on the first edge 10 and the third edge 30 that face the same direction. The PDOA measured from the first conductive patch 12 and the second conductive patch 14 may vary depending on the distance between the centers of the phase patterns. Detailed description thereof will be given below with reference to FIGS. 12, 13 and 14.

In an embodiment, the center of the phase pattern formed by the first conductive patch 12 may be moved in the direction (e.g., the first direction ①) from the first edge 10, on which the first point P1 is located, toward the second edge 20 on the opposite side. In an embodiment, the center of the phase pattern formed by the first conductive patch 12 may be located between the center C1 and the second edge 20. In an embodiment, the center of the phase pattern formed by the second conductive patch 14 may be moved in the direction (e.g., the second direction ②) from the fourth edge 40, on which the second point P2 is located, toward the third edge 30 on the opposite side. In an embodiment, the center of the phase pattern formed by the second conductive patch 14 may be located between the center C2 and the third edge 30.

Figure 10:
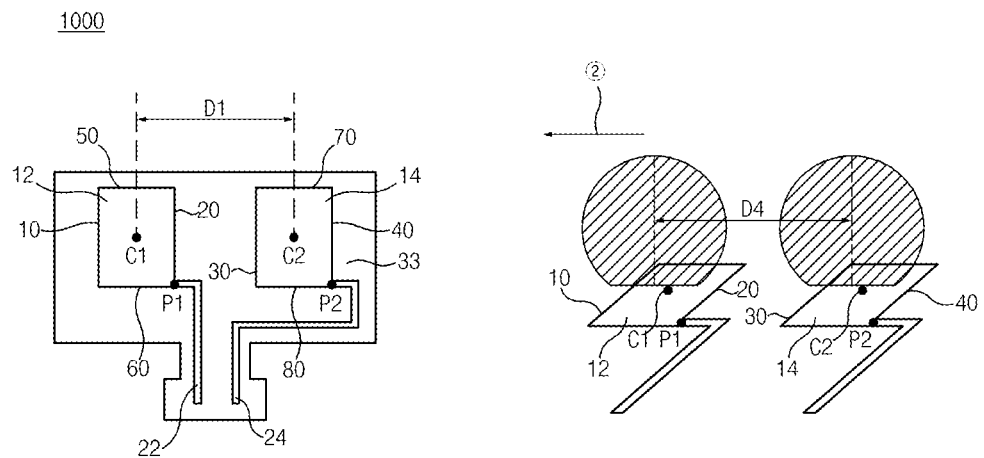
FIG. 10 is a diagram illustrating an example antenna structure and phase patterns formed by the antenna structure according to various embodiments.

FIG. 10 is a diagram illustrating an example antenna structure and phase patterns formed by the antenna structure according to various embodiments.

The descriptions of the antenna structure 800 provided with reference to FIGS. 8A, 8B, 8C and 8D may be substantially identically, similarly, or correspondingly applied to description of the antenna structure 1000 of FIG. 10.

Hereinafter, the difference from the antenna structure 800 of FIG. 8A will be described for the antenna structure 1000.

Referring to FIG. 10, the first point P1 of the first conductive patch 12 according to an embodiment may be located on the second edge 20, and the second point P2 of the second conductive patch 14 may be located on the fourth edge 40.

In an embodiment, the distance between the first point P1 and the second point P2 may be substantially the same as the specified distance D1 between the first conductive patch 12 and the second conductive patch 14, but is not limited thereto.

In an embodiment, the distance between the centers of phase patterns formed by the first conductive patch 12 and the second conductive patch 14 may vary depending on the positions of the first point P1 of the first conductive patch 12 and the second point P2 of the second conductive patch 14. In an embodiment, when the first point P1 and the second point P2 are located on the second edge 20 and the fourth edge 40 that face the same direction, the distance D4 between the centers of the phase patterns formed by the first conductive patch 12 and the second conductive patch 14 may be substantially the same as the specified distance D1. As described above with reference to FIG. 9, the distance D3 between the centers of the phase patterns may be less than the specified distance D1 when the first point P1 and the second point P2 are located on the first edge 10 and the fourth edge 40 that face opposite directions. The PDOA measured from the first conductive patch 12 and the second conductive patch 14 may vary depending on the distance between the centers of the phase patterns. Detailed description thereof will be given below with reference to FIGS. 12, 13 and 14.

In an embodiment, the center of the phase pattern formed by the first conductive patch 12 may be moved in the direction (e.g., the second direction ②) from the second edge 20, on which the first point P1 is located, toward the first edge 10 on the opposite side. In an embodiment, the center of the phase pattern formed by the first conductive patch 12 may be located between the center C1 and the first edge 10. In an embodiment, the center of the phase pattern formed by the second conductive patch 14 may be moved in the direction (e.g., the second direction ②) from the fourth edge 40, on which the second point P2 is located, toward the third edge 30 on the opposite side. In an embodiment, the center of the phase pattern formed by the second conductive patch 14 may be located between the center C2 and the third edge 30.

Figure 11:
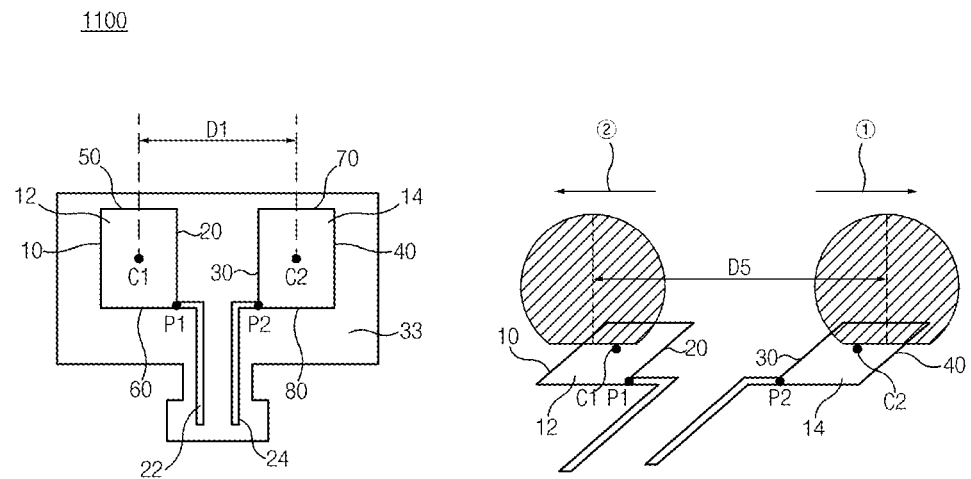
FIG. 11 is a diagram illustrating an example antenna structure and phase patterns formed by the antenna structure according to various embodiments.

FIG. 11 is a diagram illustrating an example antenna structure and phase patterns formed by the antenna structure according to various embodiments.

The descriptions of the antenna structure 800 provided with reference to FIGS. 8A, 8B, 8C and 8D may be substantially identically, similarly, or correspondingly applied to description of the antenna structure 1100 of FIG. 11.

Hereinafter, the difference from the antenna structure 800 of FIG. 8A will be described for the antenna structure 1100.

Referring to FIG. 11, the first point P1 of the first conductive patch 12 according to an embodiment may be located on the second edge 20, and the second point P2 of the second conductive patch 14 may be located on the third edge 30.

In an embodiment, the distance between the first point P1 and the second point P2 may be less than the specified distance D1 between the first conductive patch 12 and the second conductive patch 14.

In an embodiment, the distance between the centers of phase patterns formed by the first conductive patch 12 and the second conductive patch 14 may vary depending on the positions of the first point P1 of the first conductive patch 12 and the second point P2 of the second conductive patch 14. In an embodiment, when the first point P1 and the second point P2 are located on the second edge 20 and the third edge 30 that face opposite directions and that face each other, the distance D5 between the centers of the phase patterns formed by the first conductive patch 12 and the second conductive patch 14 may be greater than the specified distance D1. As described above with reference to FIG. 10, the distance D4 between the centers of the phase patterns formed by the first conductive patch 12 and the second conductive patch 14 may be substantially the same as the specified distance D1 when the first point P1 and the second point P2 are located on the second edge 20 and the fourth edge 40 that face the same direction. The PDOA measured from the first conductive patch 12 and the second conductive patch 14 may vary depending on the distance between the centers of the phase patterns. Detailed description thereof will be given below with reference to FIGS. 12, 13 and 14.

In an embodiment, the center of the phase pattern formed by the first conductive patch 12 may be moved in the direction (e.g., the second direction ②) from the second edge 20, on which the first point P1 is located, toward the first edge 10 on the opposite side. In an embodiment, the center of the phase pattern formed by the first conductive patch 12 may be located between the center C1 and the first edge 10. In an embodiment, the center of the phase pattern formed by the second conductive patch 14 may be moved in the direction (e.g., the first direction ①) from the third edge 30, on which the second point P2 is located, toward the fourth edge 40 on the opposite side. In an embodiment, the center of the phase pattern formed by the second conductive patch 14 may be located between the center C2 and the fourth edge 40.

An electronic device (e.g., the electronic device 101 of FIG. 1A) according to an example embodiment may include: an antenna structure (e.g., the second antenna 300 of FIG. 2) including at least one antenna and at least one processor (e.g., the UWB IC 592 of FIG. 3 and/or the processor 1520 of FIG. 15) operatively connected with the antenna structure. The antenna structure may include: a dielectric substance (e.g., the dielectric substance 330 of FIG. 4), a first conductive patch (e.g., the first conductive patch 12 of FIG. 8A) disposed on the dielectric substance and including a first edge (e.g., the first edge 10 of FIG. 8A) and a second edge (e.g., the second edge 20 of FIG. 8A) parallel to the first edge, a first transmission line (e.g., the first transmission line 22 of FIG. 8A, 9, 10, or 11) electrically connected to a first point (e.g., the first point P1 of FIG. 8A, 9, 10, or 11) of the first conductive patch, a second conductive patch (e.g., the second conductive patch 14 of FIG. 8A) disposed on the dielectric substance and spaced apart from the first conductive patch by a specified distance (e.g., the specified distance D1 of FIG. 8A, 9, 10, or 11) the second conductive patch including a third edge (e.g., the third edge 30 of FIG. 8A) that at least partially faces the second edge of the first conductive patch and a fourth edge (e.g., the fourth edge 40 of FIG. 8A) parallel to the third edge, a second transmission line (e.g., the second transmission line 24 of FIG. 8A, 9, 10, or 11) electrically connected to a second point (e.g., the second point P2 of FIG. 8A, 9, 10, or 11) of the second conductive patch, and a ground (e.g., the ground 350 of FIG. 4) disposed under the dielectric substance. The at least one processor may be configured to: control the electronic device to receive a wireless signal of a specified band by supplying power to the first conductive patch and the second conductive patch through the first transmission line and the second transmission line. The first point of the first conductive patch and the second point of the second conductive patch may be located on the second edge of the first conductive patch and the third edge of the second conductive patch or on the first edge of the first conductive patch and the fourth edge of the second conductive patch.

In an example embodiment, based on the specified distance being less than half of a wavelength of a wireless signal to be received using the antenna structure, the first point of the first conductive patch may be located on the second edge of the first conductive patch, and the second point of the second conductive patch may be located on the third edge of the second conductive patch.

In an example embodiment, based on the specified distance exceeding half of the wavelength of the wireless signal to be received using the antenna structure, the first point of the first conductive patch may be located on the first edge of the first conductive patch, and the second point of the second conductive patch may be located on the fourth edge of the second conductive patch.

In an example embodiment, a distance between the first point and the second point may be less than the specified distance based on the first point of the first conductive patch being located on the second edge and the second point of the second conductive patch being located on the third edge, and the distance between the first point and the second point may be greater than the specified distance based on the first point of the first conductive patch being located on the first edge and the second point of the second conductive patch being located on the fourth edge.

In an example embodiment, the specified distance may be equal to half of a wavelength of a wireless signal to be received using the antenna structure.

In an example embodiment, the first point of the first conductive patch and the second point of the second conductive patch may be located on the second edge of the first conductive patch and the third edge of the second conductive patch, respectively, such that a distance between centers of phase patterns formed from the first conductive patch and the second conductive patch is greater than the specified distance, or the first point of the first conductive patch and the second point of the second conductive patch may be located on the first edge of the first conductive patch and the fourth edge of the second conductive patch, respectively, such that the distance between the centers of the phase patterns formed from the first conductive patch and the second conductive patch is less than the specified distance.

In an example embodiment, the second edge of the first conductive patch may entirely overlap the third edge of the second conductive patch when viewed in a direction perpendicular to the second edge on substantially the same plane as the first conductive patch.

In an example embodiment, the second edge of the first conductive patch and the third edge of the second conductive patch may partially overlap each other when viewed in a direction perpendicular to the second edge on substantially the same plane as the first conductive patch.

In an example embodiment, the first conductive patch may include a fifth edge (e.g., the fifth edge 50 of FIG. 8A) extending from one end of the first edge to one end of the second edge and a sixth edge (e.g., the sixth edge 60 of FIG. 8A) extending from an opposite end of the first edge to an opposite end of the second edge, and the first point of the first conductive patch may be located at the one end of the first edge, at an opposite end of the first edge, between the one end and the opposite end of the first edge, at the one end of the second edge, at the opposite end of the second edge, or between the one end and the opposite end of the second edge.

In an example embodiment, the second conductive patch may include a seventh edge (e.g., the seventh edge 70 of FIG. 8A) extending from one end of the third edge to one end of the fourth edge and an eighth edge (e.g., the eighth edge 80 of FIG. 8A) extending from an opposite end of the third edge to an opposite end of the fourth edge. Based on the first point of the first conductive patch being located on the second edge, the second point of the second conductive patch may be located at the one end of the third edge, at an opposite end of the third edge, or between the one end and the opposite end of the third edge. Based on the first point of the first conductive patch being located on the first edge, the second point of the second conductive patch may be located at the one end of the fourth edge, at the opposite end of the fourth edge, or between the one end and the opposite end of the fourth edge.

In an example embodiment, the first conductive patch may include a fifth edge extending from one end of the first edge to one end of the second edge and a sixth edge extending from an opposite end of the first edge to an opposite end of the second edge. The second conductive patch may include a seventh edge extending from one end of the third edge to one end of the fourth edge and an eighth edge extending from an opposite end of the third edge to an opposite end of the fourth edge. The second edge of the first conductive patch may be substantially parallel to the third edge of the second conductive patch.

In an example embodiment, the first edge of the first conductive patch may be longer than the fifth edge, and the third edge of the second conductive patch may be longer than the seventh edge.

In an example embodiment, the first edge of the first conductive patch may be shorter than the fifth edge, and the third edge of the second conductive patch may be shorter than the seventh edge.

In an example embodiment, the first conductive patch and/or the second conductive patch may have a square shape or a rectangular shape.

In an example embodiment, the first conductive patch may include at least one slit (e.g., the at least one slit 3121 of FIG. 3) extending from an edge of the first conductive patch toward an inside of the first conductive patch, and the second conductive patch may include at least one slit extending from an edge of the second conductive patch toward an inside of the second conductive patch.

The electronic device according to an example embodiment may further include a third conductive patch (e.g., the third conductive patch 316 of FIG. 3) disposed on the dielectric substance. The first conductive patch and the second conductive patch may be at least partially aligned with each other on the dielectric substance in a first direction, and the first conductive patch and the third conductive patch may be at least partially aligned with each other on the dielectric substance in a second direction different from the first direction.

An electronic device (e.g., the electronic device 101 of FIG. 1A) according to an example embodiment may include: a housing (e.g., the housing 110 of FIG. 1A), a printed circuit board (e.g., the printed circuit board 150 of FIG. 1C) disposed in the housing, a support (e.g., the support member 160 of FIG. 1C) disposed on the printed circuit board and covering at least a partial area of the printed circuit board, an antenna structure (e.g., the second antenna structure 300 of FIG. 1C) disposed on the support member, and at least one processor (e.g., the UWB IC 592 of FIG. 5 and/or the processor 1520 of FIG. 15) disposed on the printed circuit board and operatively connected with the antenna structure. The antenna structure may include: a dielectric substance, a first conductive patch (e.g., the first conductive patch 12 of FIG. 8A) disposed on the dielectric substance and including a first edge (e.g., the first edge 10 of FIG. 8A) and a second edge (e.g., the second edge 20 of FIG. 8A) parallel to the first edge, a first transmission line (e.g., the first transmission line 22 of FIG. 8A, 9, 10, or 11) electrically connected to a first point (e.g., the first point P1 of FIG. 8A, 9, 10, or 11) of the first conductive patch, a second conductive patch (e.g., the second conductive patch 14 of FIG. 8A) disposed on the dielectric substance and spaced apart from the first conductive patch by a specified distance (e.g., the specified distance D1 of FIG. 8A, 9, 10, or 11) and including a third edge (e.g., the third edge 30 of FIG. 8A) at least partially facing the second edge of the first conductive patch and a fourth edge (e.g., the fourth edge 40 of FIG. 8A) parallel to the third edge, a second transmission line (e.g., the second transmission line 24 of FIG. 8A, 9, 10, or 11) electrically connected to a second point (e.g., the second point P2 of FIG. 8A, 9, 10, or 11) of the second conductive patch, and a ground (e.g., the ground 350 of FIG. 4) disposed under the dielectric substance. The at least one processor may be configured to: control the electronic device to receive a wireless signal of a specified band by supplying power to the first conductive patch and the second conductive patch through the first transmission line and the second transmission line. The first point of the first conductive patch and the second point of the second conductive patch may be located on the second edge of the first conductive patch and the third edge of the second conductive patch such that a distance (e.g., the distance D5 of FIG. 11) between centers of phase patterns formed from the first conductive patch and the second conductive patch is greater than the specified distance, or may be located on the first edge of the first conductive patch and the fourth edge of the second conductive patch such that a distance (e.g., the distance D1 of FIG. 9) between centers of phase patterns formed from the first conductive patch and the second conductive patch is less than the specified distance.

In an example embodiment, based on the specified distance being less than half of a wavelength of a wireless signal to be received using the antenna structure, the first point of the first conductive patch may be located on the second edge of the first conductive patch, and the second point of the second conductive patch may be located on the third edge of the second conductive patch.

In an example embodiment, based on the specified distance exceeding half of the wavelength of the wireless signal to be received using the antenna structure, the first point of the first conductive patch may be located on the first edge of the first conductive patch, and the second point of the second conductive patch may be located on the fourth edge of the second conductive patch.

In an example embodiment, the specified distance may be equal to half of the wavelength of the wireless signal to be received using the antenna structure.

Figure 12:
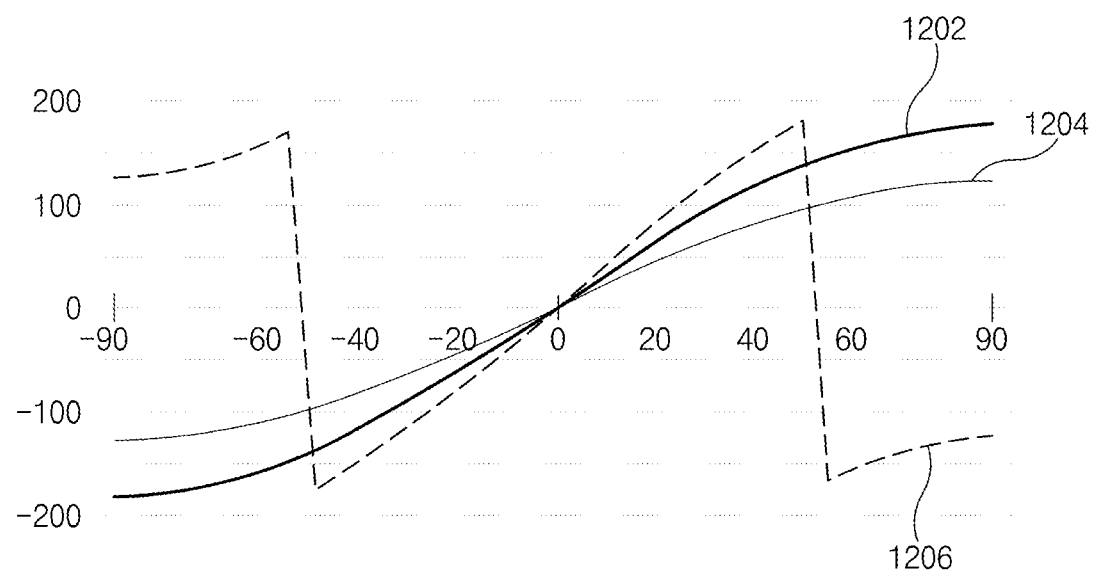
FIG. 12 is a graph depicting PDOAs measured using antenna structures depending on angles between an electronic device and an external device according to various embodiments.

FIG. 12 is a graph depicting PDOAs measured using antenna structures depending on angles between an electronic device (e.g., the electronic device 501 of FIG. 5) and an external device (e.g., the external device 502 of FIG. 7) according to various embodiments.

FIG. 12 illustrates PDOAs measured when the specified distance D1 between the first conductive patch 12 and the second conductive patch 14 is equal to half λ/2 of the wavelength of an RF signal to be received.

Referring to FIG. 12, reference numeral 1202 indicates PDOA measured using the antenna structure 800 of FIG. 8A or the antenna structure 1000 of FIG. 10.

Reference numeral 1204 indicates PDOA measured using the antenna structure 900 of FIG. 9.

Reference numeral 1206 indicates PDOA measured using the antenna structure 1100 of FIG. 11.

In an embodiment, the measured PDOAs may differ from one another because the distance between the centers of phase patterns varies depending on the positions of the first point P1 and the second point P2 even though the specified distances D1 between the conductive patches 12 and 14 of the antenna structures 800, 900, 1000, and 1100 are equal to half the wavelength.

For example, the distance (e.g., the distance D2 of FIG. 8A or the distance D4 of FIG. 10) between the centers of phase patterns formed by the antenna structure 800 or the antenna structure 1000 may be substantially the same as the specified distance D1 between the conductive patches 12 and 14 (e.g., half the wavelength). In this case, as indicated by reference numeral 1202, the PDOA measured from the antenna structure 800 or the antenna structure 1000 may be measured in the range of −180 degrees to +180 degrees for the external device located in the range of −90 degrees to +90 degrees with respect to the electronic device.

In another example, the distance D3 between the centers of phase patterns formed by the antenna structure 900 may be less than the specified distance D1 between the conductive patches 12 and 14 (e.g., half the wavelength). In this case, as indicated by reference numeral 1204, the slope of the PDOA measured by the antenna structure 900 may be gentler than the slope of the PDOA indicated by reference numeral 1202. In this case, the accuracy in measurement of the angle of arrival based on the measured PDOA may be lowered.

In another example, the distance D5 between the centers of phase patterns formed by the antenna structure 1100 may be greater than the specified distance D1 between the conductive patches 12 and 14 (e.g., half the wavelength). In this case, as indicated by reference numeral 1206, the slope of the PDOA measured using the antenna structure 1100 may be steeper than the slope of the PDOA indicated by reference numeral 1202. In this case, the same PDOA value may be measured for different angles.

Even when the electronic device includes the antenna structure 800 or the antenna structure 1000 of reference numeral 1202, PDOA measurement performance may be degraded by other factors such as a ground condition, permittivity, polarization characteristics, effects of other adjacent electronic components, and the like.

For example, in the case of the antenna structure 800 or the antenna structure 1000, the slope of the measured PDOA graph may become gentle as indicated by reference numeral 1204 due to the other factors. In this case, the PDOA measurement performance may be improved by locating the first point P1 and the second point P2 on the second edge 20 and the third edge 30 as in the antenna structure 1100.

In another example, in the case of the antenna structure 800 or the antenna structure 1000, the slope of the measured PDOA graph may become steep as indicated by reference numeral 1206 due to the other factors. In this case, the PDOA measurement performance may be improved by locating the first point P1 and the second point P2 on the first edge 10 and the fourth edge 40 as in the antenna structure 1100.

Figure 13:
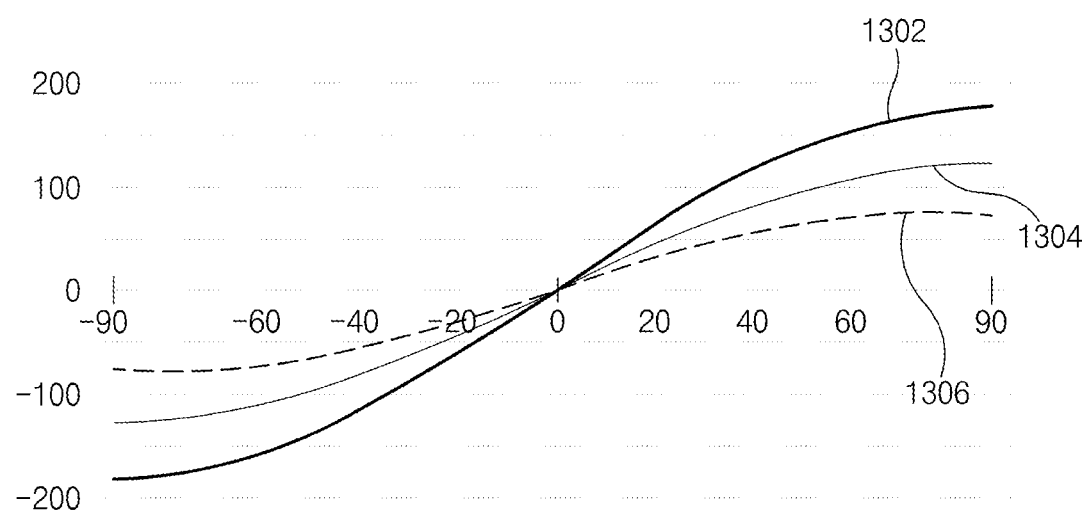
FIG. 13 is a graph depicting PDOAs measured using antenna structures depending on angles between an electronic device and an external device according to various embodiments.

FIG. 13 is a graph depicting PDOAs measured using antenna structures depending on angles between an electronic device (e.g., the electronic device 501 of FIG. 5) and an external device (e.g., the external device 502 of FIG. 7) according to various embodiments.

FIG. 13 illustrates PDOAs measured when the specified distance D1 between the conductive patches 12 and 14 of the antenna structures is less than half λ/2 of the wavelength of an RF signal to be received.

Referring to FIG. 13, reference numeral 1302 indicates PDOA measured using the antenna structure 1100 of FIG. 11.

Reference numeral 1304 indicates PDOA measured using the antenna structure 800 of FIG. 8A or the antenna structure 1000 of FIG. 10.

Reference numeral 1306 indicates PDOA measured using the antenna structure 900 of FIG. 9.

In an embodiment, the measured PDOAs may differ from one another depending on the positions of the first point P1 and the second point P2 even though the specified distances D1 between the conductive patches 12 and 14 of the antenna structures 800, 900, 1000, and 1100 are less than half the wavelength and equal to one another.

For example, the distance D5 between the centers of phase patterns formed by the antenna structure 1100 may be greater than the specified distance D1 (e.g., a value less than half the wavelength). For example, the distance D5 between the centers of the phase patterns formed by the antenna structure 1100 may be substantially the same as half the wavelength. In this case, as indicated by reference numeral 1302, the PDOA measured from the antenna structure 1100 may be measured in the range of −180 degrees to +180 degrees for the external device located in the range of −90 degrees to +90 degrees with respect to the electronic device.

In another example, the distance (e.g., the distance D2 of FIG. 8A or the distance D4 of FIG. 10) between the centers of phase patterns formed by the antenna structure 800 or the antenna structure 1000 may be substantially the same as the specified distance D1 (e.g., a value less than half the wavelength). In this case, as indicated by reference numeral 1304, the slope of the PDOA measured using the antenna structure 800 or the antenna structure 1000 may be gentler than the slope of the PDOA indicated by reference numeral 1302. In this case, the accuracy in measurement of the angle of arrival based on the measured PDOA may be lowered.

In another example, the distance D3 between the centers of phase patterns formed by the antenna structure 900 may be less than the specified distance D1 (e.g., a value less than half the wavelength). In this case, as indicated by reference numeral 1306, the slope of the PDOA measured using the antenna structure 900 may be gentler than the slope of the PDOA indicated by reference numeral 1304. In this case, the accuracy in measurement of the angle of arrival based on the measured PDOA may be lowered.

Even when the electronic device includes the antenna structure 1100 of reference numeral 1302, PDOA measurement performance may be degraded by factors other than the distance between the conductive patches 12 and 14 (e.g., a value less than half the wavelength).

For example, in the case of the antenna structure 1100, the slope of the measured PDOA graph may become steeper than the slope of the PDOA indicated by reference numeral 1302 due to the other factors. In this case, the PDOA measurement performance may be improved by decreasing the distance between the centers of the phase patterns as in the antenna structure 800, the antenna structure 900, or the antenna structure 1000.

Figure 14:
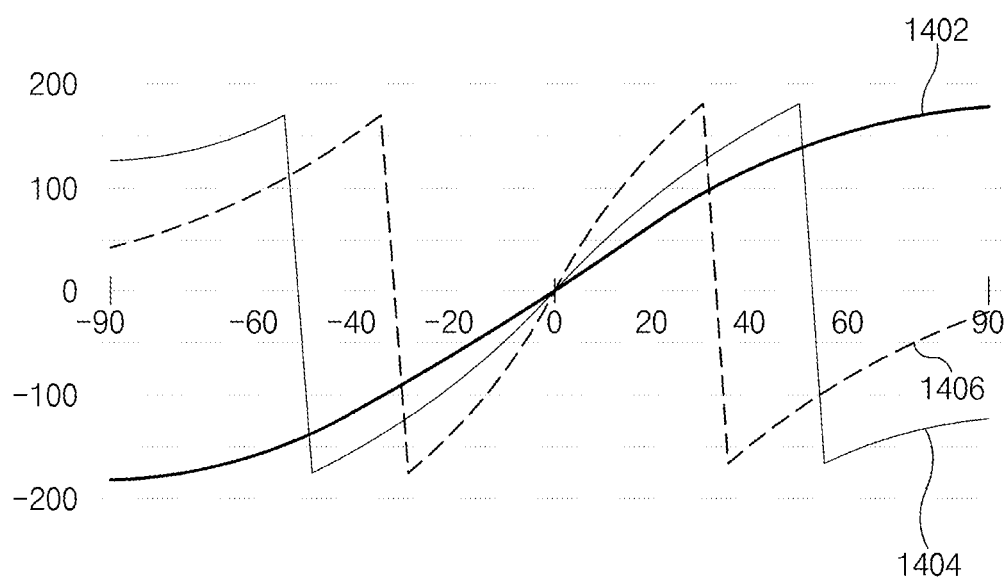
FIG. 14 is a graph depicting PDOAs measured using antenna structures depending on angles between an electronic device and an external device according to various embodiments.

FIG. 14 is a graph depicting PDOAs measured using antenna structures depending on angles between an electronic device (e.g., the electronic device 501 of FIG. 5) and an external device (e.g., the external device 502 of FIG. 7) according to various embodiments.

FIG. 14 illustrates PDOAs measured when the specified distance D1 between the first conductive patch 12 and the second conductive patch 14 is greater than half λ/2 of the wavelength of an RF signal to be received.

Referring to FIG. 14, reference numeral 1402 indicates PDOA measured using the antenna structure 900 of FIG. 9.

Reference numeral 1404 indicates PDOA measured using the antenna structure 800 of FIG. 8A or the antenna structure 1000 of FIG. 10.

Reference numeral 1406 indicates PDOA measured using the antenna structure 1100 of FIG. 11.

In an embodiment, the measured PDOAs may differ from one another depending on the positions of the first point P1 and the second point P2 even though the specified distances D1 between the conductive patches 12 and 14 of the antenna structures 800, 900, 1000, and 1100 are greater than half the wavelength and equal to one another.

For example, the distance D3 between the centers of phase patterns formed by the antenna structure 900 may be less than the specified distance D1 between the conductive patches 12 and 14 (e.g., a value greater than half the wavelength). For example, the distance D3 between the centers of the phase patterns formed by the antenna structure 900 may be substantially the same as half the wavelength. In this case, as indicated by reference numeral 1402, the PDOA measured from the antenna structure 900 may be measured in the range of −180 degrees to +180 degrees for the external device located in the range of −90 degrees to +90 degrees.

In another example, the distance (e.g., the distance D2 of FIG. 8A or the distance D4 of FIG. 10) between the centers of phase patterns formed by the antenna structure 800 or the antenna structure 1000 may be substantially the same as the specified distance D1 between the conductive patches 12 and 14 (e.g., a value greater than half the wavelength). In this case, as indicated by reference numeral 1404, the slope of the PDOA measured using the antenna structure 800 or the antenna structure 1000 may be steeper than the slope of the PDOA indicated by reference numeral 1402. In this case, the same PDOA value may be measured for different angles.

In another example, the distance D5 between the centers of phase patterns formed by the antenna structure 1100 may be greater than the specified distance D1 between the conductive patches 12 and 14 (e.g., a value greater than half the wavelength). In this case, as indicated by reference numeral 1406, the slope of the PDOA measured using the antenna structure 1100 may be steeper than the slope of the PDOA indicated by reference numeral 1404. In this case, the same PDOA value may be measured for different angles.

Even when the electronic device includes the antenna structure 900 of reference numeral 1402, PDOA measurement performance may be degraded by factors other than the distance between the conductive patches 12 and 14 (e.g., a value greater than half the wavelength).

For example, in the case of the antenna structure 900, the slope of the measured PDOA graph may become gentler than the slope of the PDOA indicated by reference numeral 1402 due to the other factors. In this case, the PDOA measurement performance may be improved by increasing the distance between the centers of the phase patterns as in the antenna structure 800, the antenna structure 1000, or the antenna structure 1100.

According to an embodiment of the disclosure, the PDOA measurement performance may be maintained or improved irrespective of the specified distance D1 between the conductive patches 12 and 14, using the phenomenon in which phase patterns vary depending on the positions of feeding points (e.g., the first point P1 and the second point P2) of the conductive patches 12 and 14. Accordingly, constraints for satisfying a required gap between the conductive patches 12 and 14 may be reduced.

FIG. 15 is a block diagram illustrating an example electronic device 1501 in a network environment 1500 according to various embodiments. Referring to FIG. 15, the electronic device 1501 in the network environment 1500 may communicate with an electronic device 1502 via a first network 1598 (e.g., a short-range wireless communication network), or at least one of an electronic device 1504 or a server 1508 via a second network 1599 (e.g., a long-range wireless communication network). According to an embodiment, the electronic device 1501 may communicate with the electronic device 1504 via the server 1508. According to an embodiment, the electronic device 1501 may include a processor 1520, memory 1530, an input module 1550, a sound output module 1555, a display module 1560, an audio module 1570, a sensor module 1576, an interface 1577, a connecting terminal 1578, a haptic module 1579, a camera module 1580, a power management module 1588, a battery 1589, a communication module 1590, a subscriber identification module (SIM) 1596, or an antenna module 1597. In various embodiments, at least one of the components (e.g., the connecting terminal 1578) may be omitted from the electronic device 1501, or one or more other components may be added in the electronic device 1501. In various embodiments, some of the components (e.g., the sensor module 1576, the camera module 1580, or the antenna module 1597) may be implemented as a single component (e.g., the display module 1560).

The processor 1520 may execute, for example, software (e.g., a program 1540) to control at least one other component (e.g., a hardware or software component) of the electronic device 1501 coupled with the processor 1520, and may perform various data processing or computation. According to an embodiment, as at least part of the data processing or computation, the processor 1520 may store a command or data received from another component (e.g., the sensor module 1576 or the communication module 1590) in volatile memory 1532, process the command or the data stored in the volatile memory 1532, and store resulting data in non-volatile memory 1534. According to an embodiment, the processor 1520 may include a main processor 1521 (e.g., a central processing unit (CPU) or an application processor (AP)), or an auxiliary processor 1523 (e.g., a graphics processing unit (GPU), a neural processing unit (NPU), an image signal processor (ISP), a sensor hub processor, or a communication processor (CP)) that is operable independently from, or in conjunction with, the main processor 1521. For example, when the electronic device 1501 includes the main processor 1521 and the auxiliary processor 1523, the auxiliary processor 1523 may be adapted to consume less power than the main processor 1521, or to be specific to a specified function. The auxiliary processor 1523 may be implemented as separate from, or as part of the main processor 1521.

The auxiliary processor 1523 may control at least some of functions or states related to at least one component (e.g., the display module 1560, the sensor module 1576, or the communication module 1590) among the components of the electronic device 1501, instead of the main processor 1521 while the main processor 1521 is in an inactive (e.g., sleep) state, or together with the main processor 1521 while the main processor 1521 is in an active state (e.g., executing an application). According to an embodiment, the auxiliary processor 1523 (e.g., an image signal processor or a communication processor) may be implemented as part of another component (e.g., the camera module 1580 or the communication module 1590) functionally related to the auxiliary processor 1523. According to an embodiment, the auxiliary processor 1523 (e.g., the neural processing unit) may include a hardware structure specified for artificial intelligence model processing. An artificial intelligence model may be generated by machine learning. Such learning may be performed, e.g., by the electronic device 1501 where the artificial intelligence is performed or via a separate server (e.g., the server 1508). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1530 may store various data used by at least one component (e.g., the processor 1520 or the sensor module 1576) of the electronic device 1501. The various data may include, for example, software (e.g., the program 1540) and input data or output data for a command related thererto. The memory 1530 may include the volatile memory 1532 or the non-volatile memory 1534.

The program 1540 may be stored in the memory 1530 as software, and may include, for example, an operating system (OS) 1542, middleware 1544, or an application 1546.

The input module 1550 may receive a command or data to be used by another component (e.g., the processor 1520) of the electronic device 1501, from the outside (e.g., a user) of the electronic device 1501. The input module 1550 may include, for example, a microphone, a mouse, a keyboard, a key (e.g., a button), or a digital pen (e.g., a stylus pen).

The sound output module 1555 may output sound signals to the outside of the electronic device 1501. The sound output module 1555 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1560 may visually provide information to the outside (e.g., a user) of the electronic device 1501. The display module 1560 may include, for example, a display, a hologram device, or a projector and control circuitry to control a corresponding one of the display, hologram device, and projector. According to an embodiment, the display module 1560 may include a touch sensor adapted to detect a touch, or a pressure sensor adapted to measure the intensity of force incurred by the touch.

The audio module 1570 may convert a sound into an electrical signal and vice versa. According to an embodiment, the audio module 1570 may obtain the sound via the input module 1550, or output the sound via the sound output module 1555 or a headphone of an external electronic device (e.g., an electronic device 1502) directly (e.g., wiredly) or wirelessly coupled with the electronic device 1501.

The sensor module 1576 may detect an operational state (e.g., power or temperature) of the electronic device 1501 or an environmental state (e.g., a state of a user) external to the electronic device 1501, and then generate an electrical signal or data value corresponding to the detected state. According to an embodiment, the sensor module 1576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1577 may support one or more specified protocols to be used for the electronic device 1501 to be coupled with the external electronic device (e.g., the electronic device 1502) directly (e.g., wiredly) or wirelessly. According to an embodiment, the interface 1577 may include, for example, a high definition multimedia interface (HDMI), a universal serial bus (USB) interface, a secure digital (SD) card interface, or an audio interface.

A connecting terminal 1578 may include a connector via which the electronic device 1501 may be physically connected with the external electronic device (e.g., the electronic device 1502). According to an embodiment, the connecting terminal 1578 may include, for example, a HDMI connector, a USB connector, a SD card connector, or an audio connector (e.g., a headphone connector).

The haptic module 1579 may convert an electrical signal into a mechanical stimulus (e.g., a vibration or a movement) or electrical stimulus which may be recognized by a user via his tactile sensation or kinesthetic sensation. According to an embodiment, the haptic module 1579 may include, for example, a motor, a piezoelectric element, or an electric stimulator.

The camera module 1580 may capture a still image or moving images. According to an embodiment, the camera module 1580 may include one or more lenses, image sensors, image signal processors, or flashes.

The power management module 1588 may manage power supplied to the electronic device 1501. According to an embodiment, the power management module 1588 may be implemented as at least part of, for example, a power management integrated circuit (PMIC).

The battery 1589 may supply power to at least one component of the electronic device 1501. According to an embodiment, the battery 1589 may include, for example, a primary cell which is not rechargeable, a secondary cell which is rechargeable, or a fuel cell.

The communication module 1590 may support establishing a direct (e.g., wired) communication channel or a wireless communication channel between the electronic device 1501 and the external electronic device (e.g., the electronic device 1502, the electronic device 1504, or the server 1508) and performing communication via the established communication channel. The communication module 1590 may include one or more communication processors that are operable independently from the processor 1520 (e.g., the application processor (AP)) and supports a direct (e.g., wired) communication or a wireless communication. According to an embodiment, the communication module 1590 may include a wireless communication module 1592 (e.g., a cellular communication module, a short-range wireless communication module, or a global navigation satellite system (GNSS) communication module) or a wired communication module 1594 (e.g., a local area network (LAN) communication module or a power line communication (PLC) module). A corresponding one of these communication modules may communicate with the external electronic device via the first network 1598 (e.g., a short-range communication network, such as Bluetooth™, wireless-fidelity (Wi-Fi) direct, or infrared data association (IrDA)) or the second network 1599 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1592 may identify and authenticate the electronic device 1501 in a communication network, such as the first network 1598 or the second network 1599, using subscriber information (e.g., international mobile subscriber identity (IMSI)) stored in the subscriber identification module 1596.

The wireless communication module 1592 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1592 may support a high-frequency band (e.g., the mmWave band) to achieve, e.g., a high data transmission rate. The wireless communication module 1592 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1592 may support various requirements specified in the electronic device 1501, an external electronic device (e.g., the electronic device 1504), or a network system (e.g., the second network 1599). According to an embodiment, the wireless communication module 1592 may support a peak data rate (e.g., 20 Gbps or more) for implementing eMBB, loss coverage (e.g., 1564 dB or less) for implementing mMTC, or U-plane latency (e.g., 0.5 ms or less for each of downlink (DL) and uplink (UL), or a round trip of 15 ms or less) for implementing URLLC.

The antenna module 1597 may transmit or receive a signal or power to or from the outside (e.g., the external electronic device) of the electronic device 1501. According to an embodiment, the antenna module 1597 may include an antenna including a radiating element including a conductive material or a conductive pattern formed in or on a substrate (e.g., a printed circuit board (PCB)). According to an embodiment, the antenna module 1597 may include a plurality of antennas (e.g., array antennas). In such a case, at least one antenna appropriate for a communication scheme used in the communication network, such as the first network 1598 or the second network 1599, may be selected, for example, by the communication module 1590 (e.g., the wireless communication module 1592) from the plurality of antennas. The signal or the power may then be transmitted or received between the communication module 1590 and the external electronic device via the selected at least one antenna. According to an embodiment, another component (e.g., a radio frequency integrated circuit (RFIC)) other than the radiating element may be additionally formed as part of the antenna module 1597.

According to various embodiments, the antenna module 1597 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1501 and the external electronic device 1504 via the server 1508 coupled with the second network 1599. Each of the electronic devices 1502 or 1504 may be a device of a same type as, or a different type, from the electronic device 1501. According to an embodiment, all or some of operations to be executed at the electronic device 1501 may be executed at one or more of the external electronic devices 1502, 1504, or 1508. For example, if the electronic device 1501 should perform a function or a service automatically, or in response to a request from a user or another device, the electronic device 1501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1501. The electronic device 1501 may provide the outcome, with or without further processing of the outcome, as at least part of a reply to the request. To that end, a cloud computing, distributed computing, mobile edge computing (MEC), or client-server computing technology may be used, for example. The electronic device 1501 may provide ultra low-latency services using, e.g., distributed computing or mobile edge computing. In an embodiment, the external electronic device 1504 may include an internet-of-things (IoT) device. The server 1508 may be an intelligent server using machine learning and/or a neural network. According to an embodiment, the external electronic device 1504 or the server 1508 may be included in the second network 1599. The electronic device 1501 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1540) including one or more instructions that are stored in a storage medium (e.g., internal memory 1536 or external memory 1538) that is readable by a machine (e.g., the electronic device 1501). For example, a processor (e.g., the processor 1520) of the machine (e.g., the electronic device 1501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   an antenna structure comprising at least one antenna; and
   at least one processor operatively connected with the antenna structure,
   wherein the antenna structure includes:
   a dielectric substance;
   a first conductive patch disposed on the dielectric substance, the first conductive patch including a first edge and a second edge parallel to the first edge;
   a first transmission line electrically connected to a first point of the first conductive patch;
   a second conductive patch disposed on the dielectric substance and spaced apart from the first conductive patch by a specified distance, the second conductive patch including a third edge at least partially facing the second edge of the first conductive patch and a fourth edge parallel to the third edge;
   a second transmission line electrically connected to a second point of the second conductive patch; and
   a ground disposed under the dielectric substance,
   wherein the at least one processor is configured to: control the electronic device to receive wireless signals of a specified band by supplying power to the first conductive patch and the second conductive patch through the first transmission line and the second transmission line and determine phase difference of arrival (PDOA) between wireless signals received by the first conductive patch and the second conductive patch, and
   wherein
   the specified distance is less than half of a wavelength of the wireless signals received by the first conductive patch and the second conductive patch, the first point of the first conductive patch is located on the second edge of the first conductive patch, and the second point of the second conductive patch is located on the third edge of the second conductive patch; or the specified distance exceeds half of the wavelength of the wireless signals received by the first conductive patch and the second conductive patch, the first point of the first conductive patch is located on the first edge of the first conductive patch, and the second point of the second conductive patch is located on the fourth edge of the second conductive patch.

2. The electronic device of claim 1, wherein a distance between the first point and the second point is less than the specified distance the first point of the first conductive patch is located on the second edge, and the second point of the second conductive patch is located on the third edge, or
wherein the distance between the first point and the second point is greater than the specified distance, the first point of the first conductive patch is located on the first edge, and the second point of the second conductive patch is located on the fourth edge.

3. The electronic device of claim 1, wherein the first point of the first conductive patch and the second point of the second conductive patch are located:
on the second edge of the first conductive patch and the third edge of the second conductive patch such that a distance between centers of phase patterns formed from the first conductive patch and the second conductive patch is greater than the specified distance; or
on the first edge of the first conductive patch and the fourth edge of the second conductive patch such that the distance between the centers of the phase patterns formed from the first conductive patch and the second conductive patch is less than the specified distance.

4. The electronic device of claim 1, wherein the second edge of the first conductive patch entirely overlaps the third edge of the second conductive patch when viewed in a direction perpendicular to the second edge on substantially a same plane as the first conductive patch.

5. The electronic device of claim 1, wherein the second edge of the first conductive patch and the third edge of the second conductive patch partially overlap each other when viewed in a direction perpendicular to the second edge on substantially a same plane as the first conductive patch.

6. The electronic device of claim 1, wherein the first conductive patch includes a fifth edge extending from one end of the first edge to one end of the second edge and a sixth edge extending from an opposite end of the first edge to an opposite end of the second edge, and
wherein the first point of the first conductive patch is located:
at the one end of the first edge;
at the opposite end of the first edge;
between the one end and the opposite end of the first edge;
at the one end of the second edge;
at the opposite end of the second edge; or
between the one end and the opposite end of the second edge.

7. The electronic device of claim 6, wherein the second conductive patch includes a seventh edge extending from one end of the third edge to one end of the fourth edge and an eighth edge extending from an opposite end of the third edge to an opposite end of the fourth edge,
wherein the first point of the first conductive patch is located on the second edge, and the second point of the second conductive patch is located:
at the one end of the third edge;
at the opposite end of the third edge; or
between the one end and the opposite end of the third edge, or wherein the first point of the first conductive patch is located on the first edge, and the second point of the second conductive patch is located:
at the one end of the fourth edge;
at the opposite end of the fourth edge; or
between the one end and the opposite end of the fourth edge.

8. The electronic device of claim 1, wherein the first conductive patch includes a fifth edge extending from one end of the first edge to one end of the second edge and a sixth edge extending from an opposite end of the first edge to an opposite end of the second edge,
wherein the second conductive patch includes a seventh edge extending from one end of the third edge to one end of the fourth edge and an eighth edge extending from an opposite end of the third edge to an opposite end of the fourth edge, and
wherein the second edge of the first conductive patch is substantially parallel to the third edge of the second conductive patch.

9. The electronic device of claim 8, wherein the first edge of the first conductive patch is longer than the fifth edge, and
wherein the third edge of the second conductive patch is longer than the seventh edge.

10. The electronic device of claim 8, wherein the first edge of the first conductive patch is shorter than the fifth edge, and
wherein the third edge of the second conductive patch is shorter than the seventh edge.

11. The electronic device of claim 1, wherein the first conductive patch and/or the second conductive patch has a square shape or a rectangular shape.

12. The electronic device of claim 11, wherein the first conductive patch includes at least one slit extending from an edge of the first conductive patch toward an inside of the first conductive patch, and
wherein the second conductive patch includes at least one slit extending from an edge of the second conductive patch toward an inside of the second conductive patch.

13. The electronic device of claim 1, further comprising:
a third conductive patch disposed on the dielectric substance,
wherein the first conductive patch and the second conductive patch are at least partially aligned with each other on the dielectric substance in a first direction, and
wherein the first conductive patch and the third conductive patch are at least partially aligned with each other on the dielectric substance in a second direction different from the first direction.

14. An electronic device comprising:
a housing;
a printed circuit board disposed in the housing;
a support disposed on the printed circuit board and configured to cover at least a partial area of the printed circuit board;
an antenna structure disposed on the support; and
at least one processor disposed on the printed circuit board and operatively connected with the antenna structure,
wherein the antenna structure includes:
a dielectric substance;
a first conductive patch disposed on the dielectric substance, the first conductive patch including a first edge and a second edge parallel to the first edge;
a first transmission line electrically connected to a first point of the first conductive patch;

a second conductive patch disposed on the dielectric substance and spaced apart from the first conductive patch by a specified distance, the second conductive patch including a third edge at least partially facing the second edge of the first conductive patch and a fourth edge parallel to the third edge;

a second transmission line electrically connected to a second point of the second conductive patch; and a ground disposed under the dielectric substance, wherein the at least one processor is configured to control the electronic device to receive wireless signals of a specified band by supplying power to the first conductive patch and the second conductive patch through the first transmission line and the second transmission line and determine phase difference of arrival (PDOA) between wireless signals received by the first conductive patch and the second conductive patch, and wherein the first point of the first conductive patch and the second point of the second conductive patch are located:

on the second edge of the first conductive patch and the third edge of the second conductive patch such that a distance between centers of phase patterns formed from the first conductive patch and the second conductive patch is greater than the specified distance; or on the first edge of the first conductive patch and the fourth edge of the second conductive patch such that the distance between the centers of the phase patterns formed from the first conductive patch and the second conductive patch is less than the specified distance.

15. The electronic device of claim 14, wherein the specified distance is less than half of a wavelength of the wireless signals received by the first conductive patch and the second conductive patch, the first point of the first conductive patch is located on the second edge of the first conductive patch, and the second point of the second conductive patch is located on the third edge of the second conductive patch.

16. The electronic device of claim 14, wherein the specified distance exceeds half of a wavelength of the wireless signals received by the first conductive patch and the second conductive patch, the first point of the first conductive patch is located on the first edge of the first conductive patch, and the second point of the second conductive patch is located on the fourth edge of the second conductive patch.

* * * * *